United States Patent [19]
Kurematsu et al.

[11] Patent Number: 5,816,677
[45] Date of Patent: Oct. 6, 1998

[54] BACKLIGHT DEVICE FOR DISPLAY APPARATUS

[75] Inventors: Katsumi Kurematsu; Yoshihiro Onitsuka, both of Hiratsuka; Toshiyuki Kanda, Chigasaki, all of Japan

[73] Assignee: Canon Kabushiki Kaisha, Tokyo, Japan

[21] Appl. No.: 446,994

[22] Filed: May 22, 1995

[30] Foreign Application Priority Data

Mar. 1, 1905 [JP] Japan .................................. 7-042194
May 27, 1994 [JP] Japan .................................. 6-137894

[51] Int. Cl.⁶ ........................................................ F21V 8/00
[52] U.S. Cl. .............................. 362/31; 362/26; 362/330
[58] Field of Search ................................ 362/26, 31, 330; 349/62, 65, 70

[56] References Cited

U.S. PATENT DOCUMENTS

| | | | |
|---|---|---|---|
| 4,510,559 | 4/1985 | Kristofek | 362/269 |
| 4,510,560 | 4/1985 | Negishi | 362/299 |
| 4,981,340 | 1/1991 | Kurematsu et al. | |
| 5,150,231 | 9/1992 | Iwamoto et al. | 359/44 |
| 5,251,050 | 10/1993 | Kurematsu et al. | 359/57 |
| 5,341,231 | 8/1994 | Yamamoto et al. | 362/31 |
| 5,381,256 | 1/1995 | Hanyu et al. | 359/75 |
| 5,408,388 | 4/1995 | Kobayashi et al. | 362/26 |
| 5,410,454 | 4/1995 | Murase et al. | 362/31 |
| 5,467,417 | 11/1995 | Nakamura et al. | 362/31 |
| 5,491,525 | 2/1996 | Yamasaki et al. | 359/49 |

FOREIGN PATENT DOCUMENTS

| | | |
|---|---|---|
| 5518/61 | 5/1963 | Australia . |
| 29380/63 | 10/1964 | Australia . |
| 65453/65 | 4/1967 | Australia . |
| 86226/91 | 4/1992 | Australia . |
| 0377309 | 7/1990 | European Pat. Off. . |
| 0573905 | 12/1993 | European Pat. Off. . |
| 57-128383 | 8/1982 | Japan . |
| 63-13202 | 1/1988 | Japan . |
| 2-39118 | 2/1990 | Japan . |
| 4-71105 | 3/1992 | Japan . |
| 5281541 | 10/1993 | Japan . |
| 5323318 | 12/1993 | Japan . |
| 6-18873 | 1/1994 | Japan . |
| 2259359 | 3/1993 | United Kingdom . |

OTHER PUBLICATIONS

Patent Abstracts of Japan, vol. 16 No. 278 (M–1268), 22 Jun. 1992 & JP–A–04 071105 (Canon Inc) 5 Mar. 1992, *abstract*.

Patent Abstracts of Japan, vol. 18 No. 146 (P–1707), 10 Mar. 1994 & JP–A–05 323318 (Sony Corp) 7 Dec. 1993, *abstract*.

*Primary Examiner*—Thomas M. Sember
*Attorney, Agent, or Firm*—Fitzpatrick, Cella, Harper & Scinto

[57] ABSTRACT

A backlight device suitable for illuminating a transmission-type display device, such as a liquid crystal device, is constituted by a reflection member for reflecting light, a transmission member disposed opposite to the reflection member so as to form a space from the reflection member, and a light source disposed to emit light into the space. Light issued from the light source into the space is reflected by the reflection member and transmitted through the transmission member. The transmission member is preferably provided with a reflection layer having apertures having an aperture ratio which increases with an increase in distance from the light source toward a center of the space in a linear function, a hyperbolic function or a function intermediate therebetween of the distance from the light source. Between the transmission member and the display device, a prism sheet and/or a diffusion sheet may be disposed so as to improve the frontal illumination performance.

23 Claims, 19 Drawing Sheets

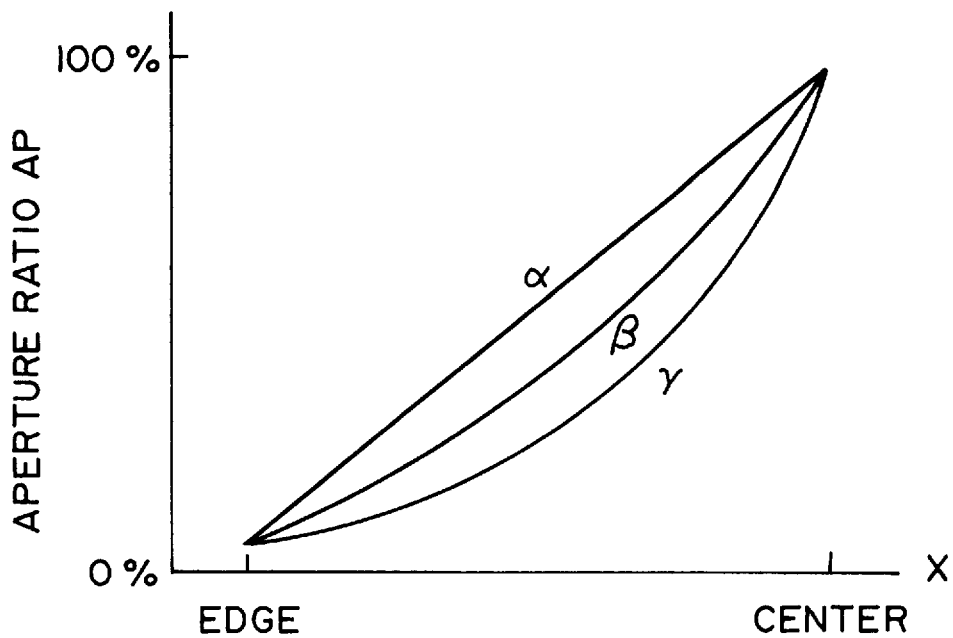
F I G. 6
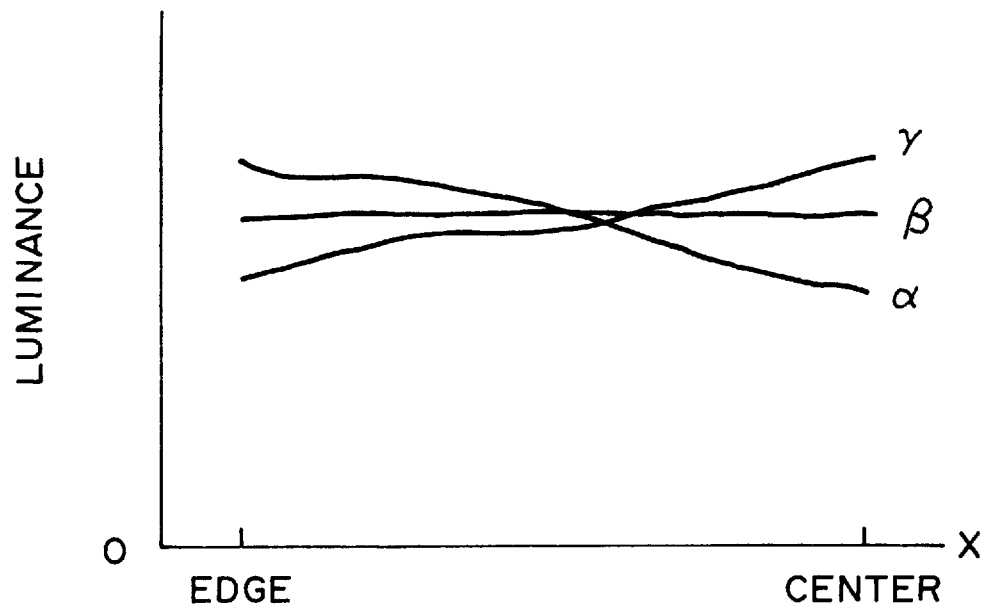
F I G. 7

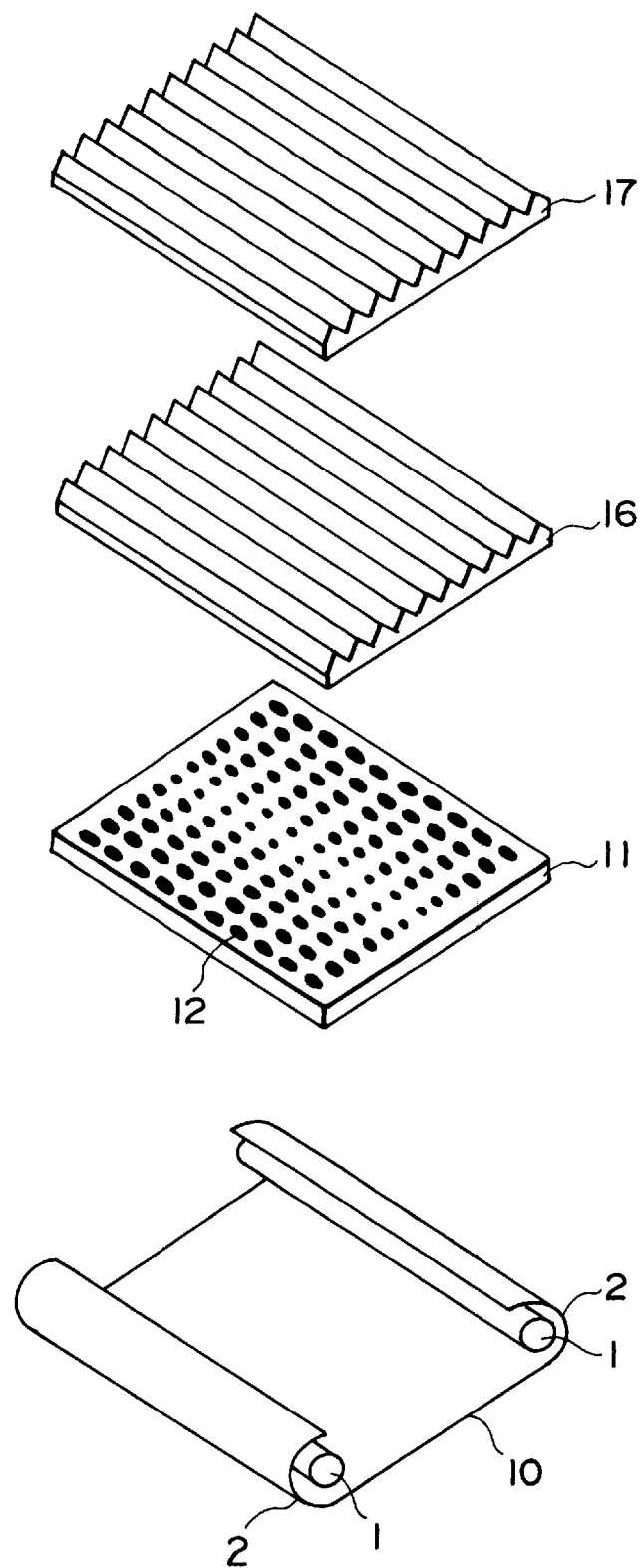
F I G. 9

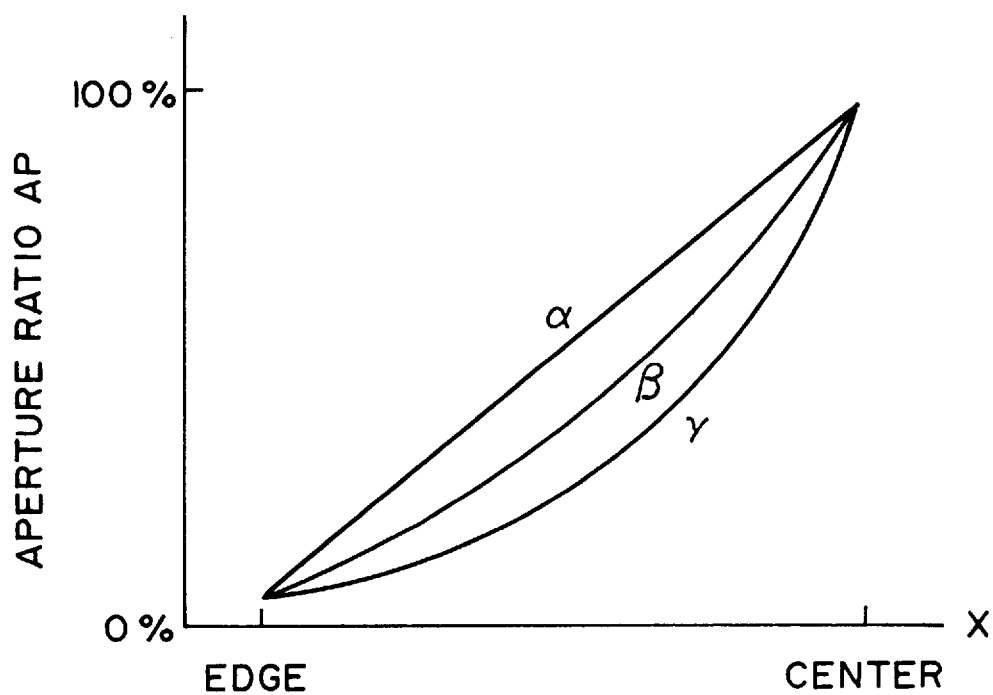
F I G. 10

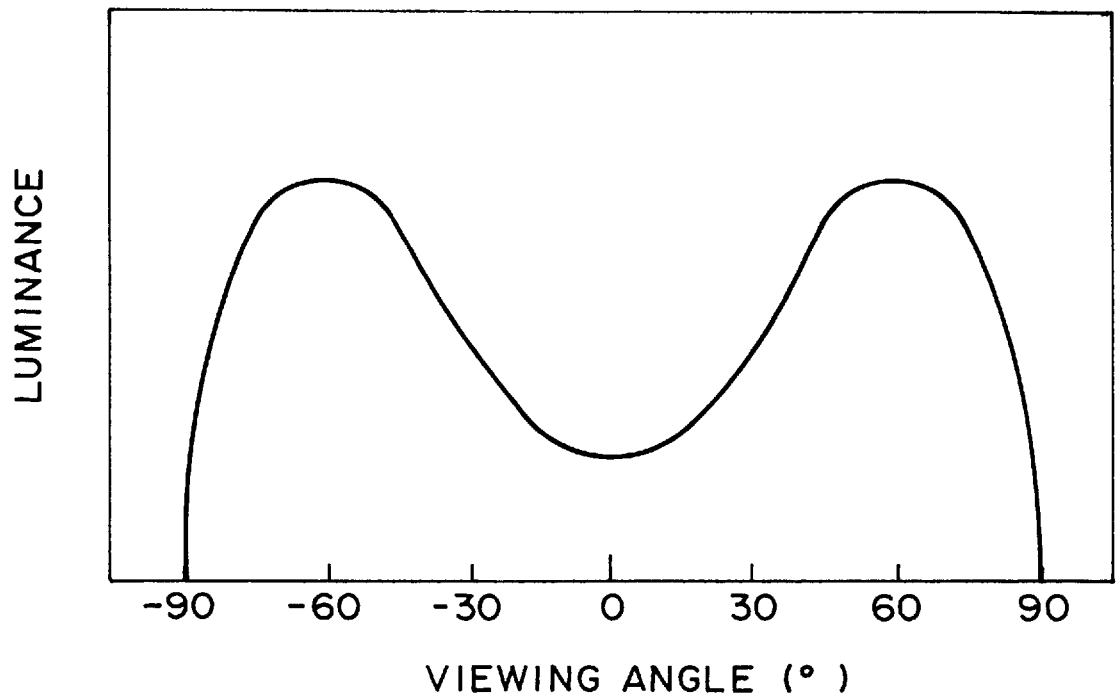
F I G. 11A
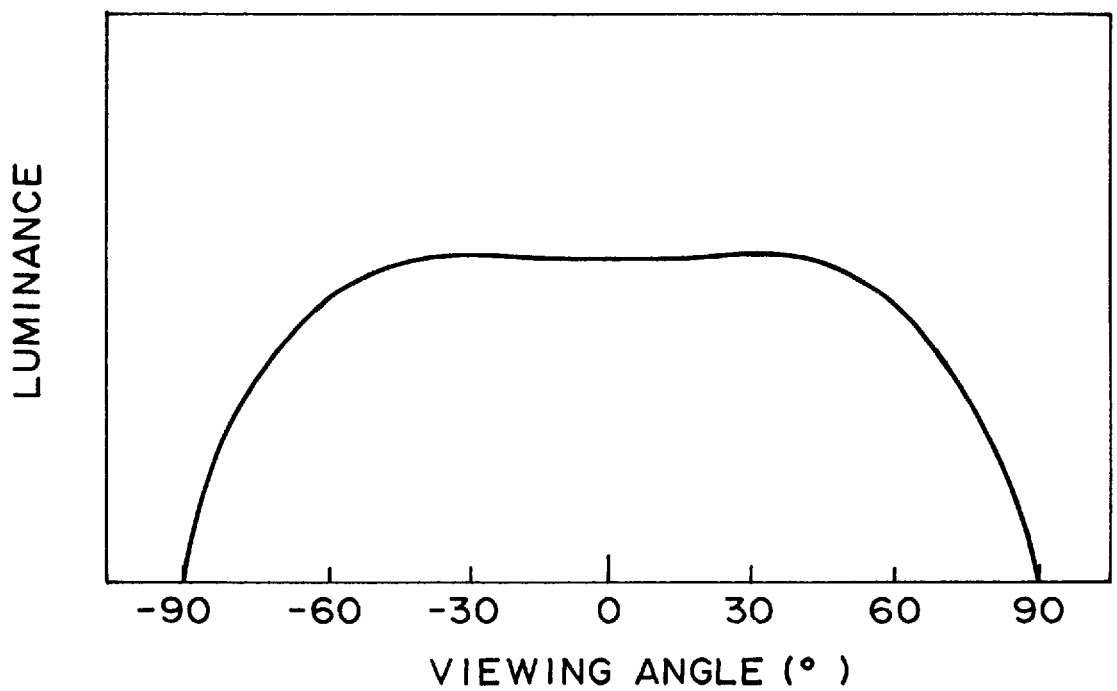
F I G. 11B

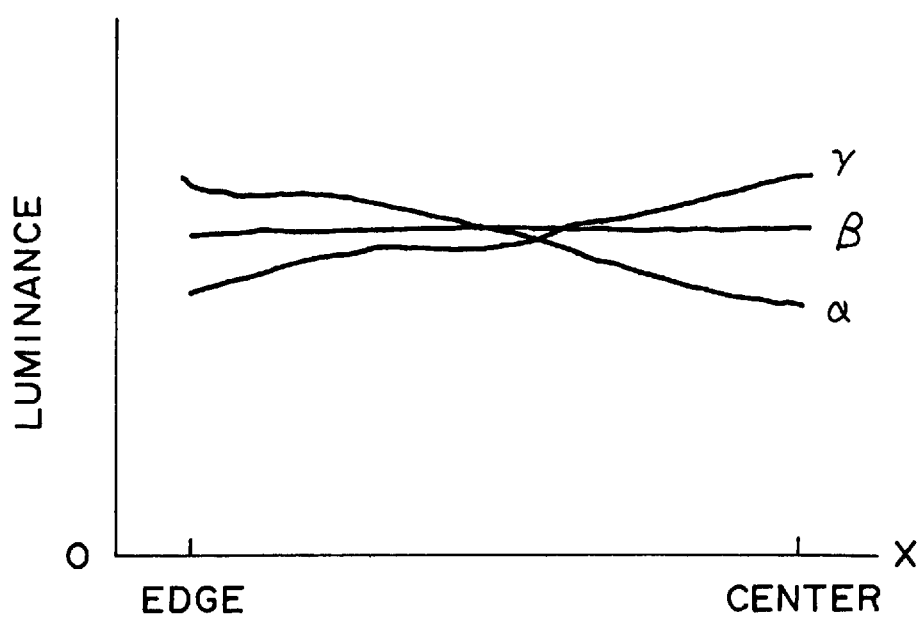
F I G. 12

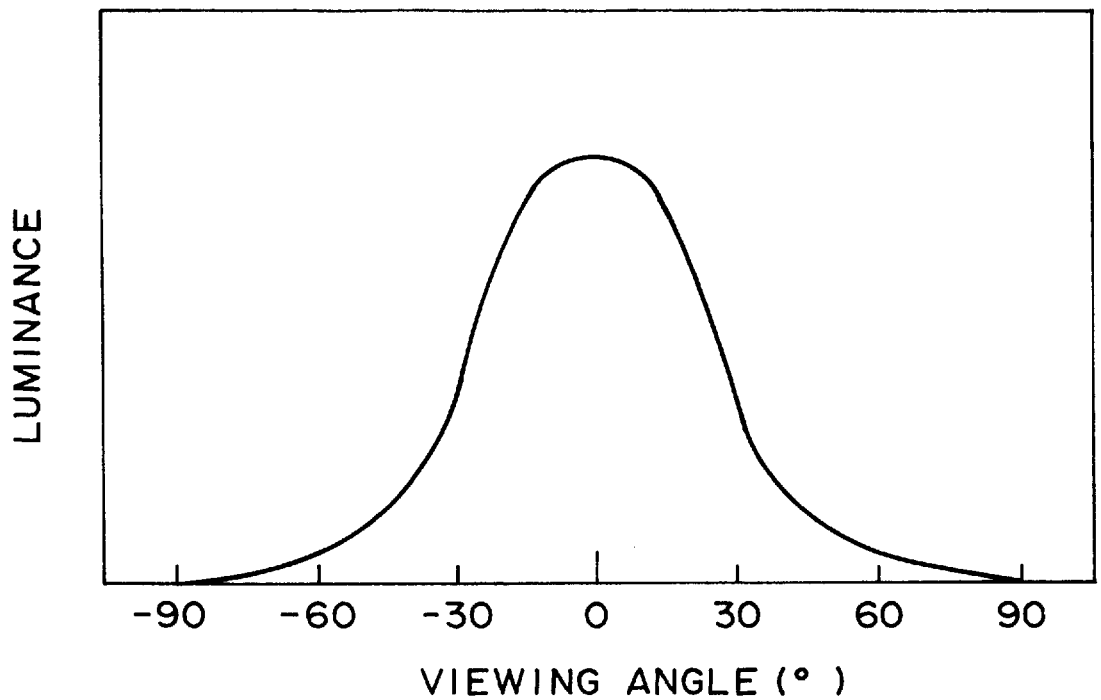
F I G. 15
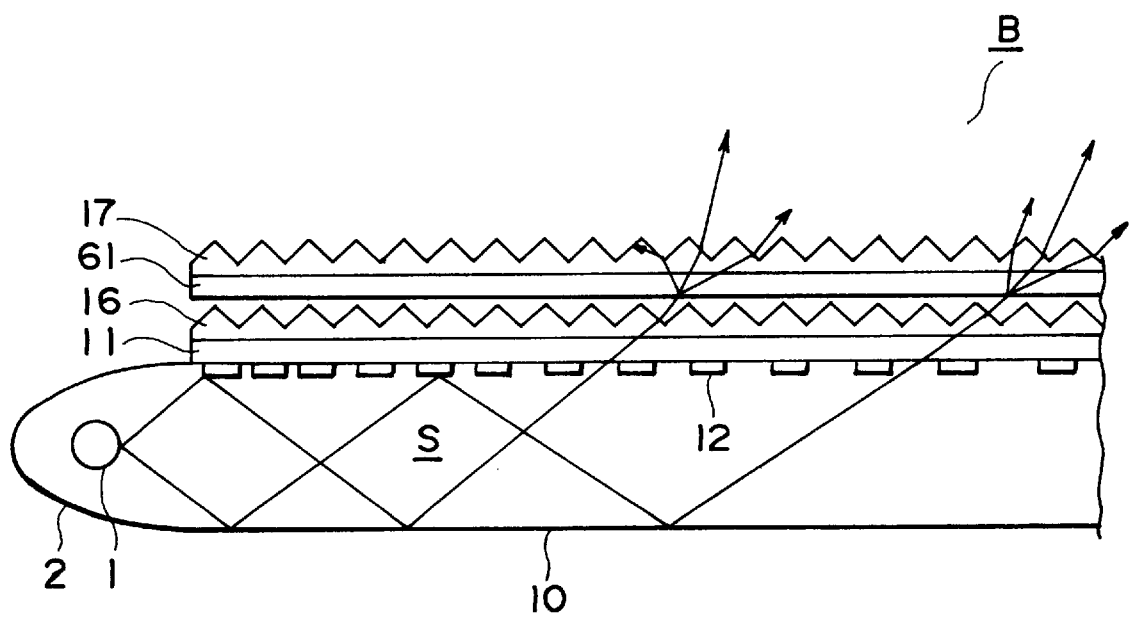
F I G. 16

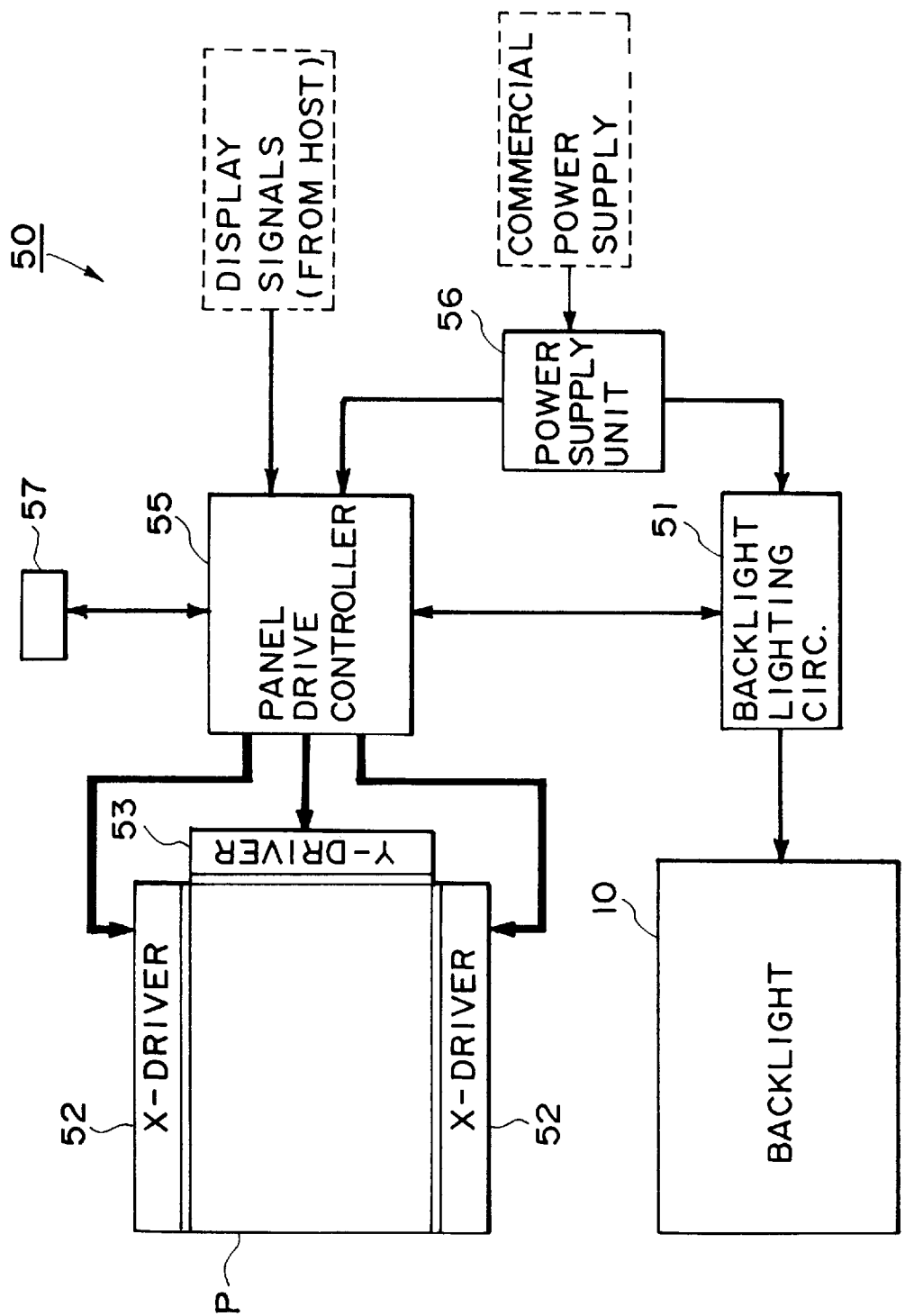
F I G. 20

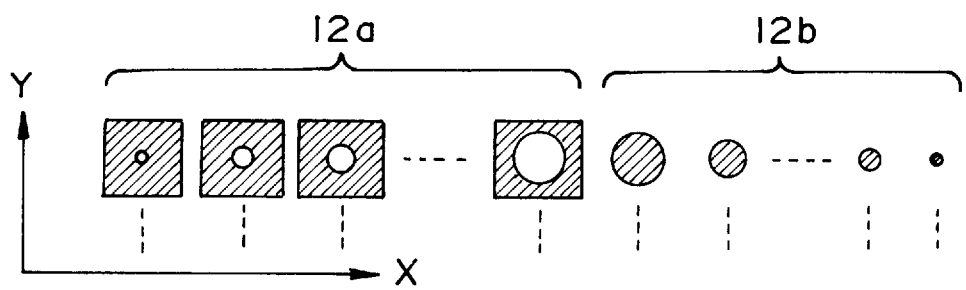
F I G. 22
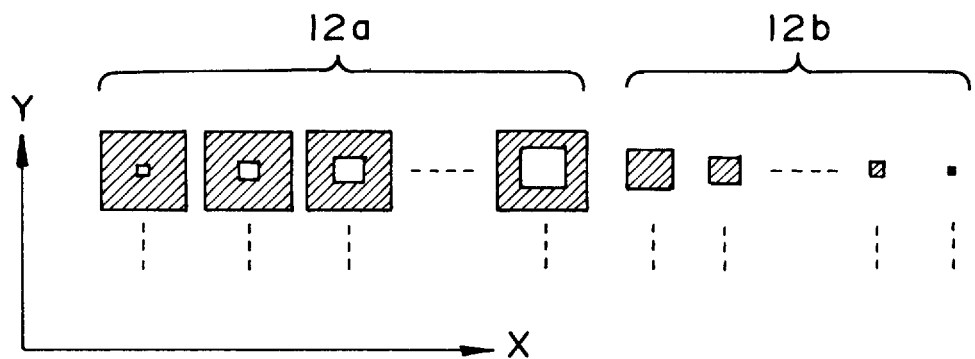
F I G. 23

BACKLIGHT DEVICE FOR DISPLAY APPARATUS

FIELD OF THE INVENTION AND RELATED ART

The present invention relates to a backlight device for display apparatus, such as those for computers, word processors, television receivers and navigation systems, and view finders for video cameras.

Backlight devices or display apparatus may be classified into the direct backing-type and the edge (or H-arrangement)-type. Examples of the former type have been disclosed in Japanese Laid-Open Patent Appln. (JP-A) 2-39118 and JP-A 6-18873, and examples of the latter type have been disclosed in JP-A 63-13202, JP-A 4-71105, JP-A 5-281541 and JP-A 5-323318. A representative example of the H-arrangement-type backlight device for a transmission-type liquid crystal panel has been proposed by JP-A 57-128383 and FIG. 21 is a schematic illustration thereof.

Referring to FIG. 21, a backlight device $B_0$ includes a fluorescent lamp 1 as a light source and a reflector 2 disposed to surround the fluorescent lamp 1. Extending sidewards from the fluorescent lamp 1 is disposed a light-guide member 3 of a thick transparent plate of, e.g., acrylic resin. Behind the light-guide member 3, light-scattering layers 5 are disposed in a prescribed areal proportion. Light issued from the fluorescent lamp 1 and entering the light-guide member 3 is scattered by the scattering layers 5 and issued from the front face of the light-guide member 3 to illuminate a liquid crystal panel (not shown) at a uniform illuminance.

In the above-mentioned backlight device, the light-guide member 3 is composed of, e.g., an acrylic resin, and is therefore heavy, so that the backlight device becomes heavy and suffers from inferior conveyability. Particularly, in recent years, a liquid crystal panel size is enlarged so that the backlight is also enlarged. Accordingly, the light-guide member is thick and enlarged in area, so that the above-mentioned difficulty is promoted.

For the above reason, a backlight device using no light-guide member has been proposed as in JP-A 5-323318. The backlight device has resulted in a poor planar illumination uniformity and is unsuitable for a large area display apparatus having a diagonal size of 15 inches or larger. Further, the backlight device is required have a backing reflector shaped in a parabora curved surface and requires a substantial production cost.

JP-A 5-281541 also discloses a backlight device capable of dispensing with a light-guide member, but the device also suffers from a poor planar illumination uniformity, which becomes noticeable in a large-area display apparatus having a diagonal display area size of 15 inches or larger.

On the other hand, direct backing-type backlight devices generally require a large thickness behind display apparatus and are unsuitable for flat panel displays. Particularly, uniform illumination light cannot be attained for large area display apparatus unless a large number of light sources (fluorescent lamps) are used. Anyway, direct backing-type backlight devices are liable to be complicated and expensive for a larger size and are believed to be unsuitable for flat panel-type display apparatus of an increasingly large display area.

Accordingly, it has been desired to develop an improved edge-type or H-(arrangement-)type backlight device, instead of a direct backing-type device, through elimination of various difficulties of the edge-type backlight device.

SUMMARY OF THE INVENTION

An object of the present invention is to provide a backlight device for display apparatus capable of issuing uniform illumination light without using a light-guide member occupying a substantial part of the total weight of such a backlight device, when used.

Another object of the present invention is to provide a backlight device for display apparatus, which is light and excellent in portability.

Another object of the present invention is to provide a backlight device for display apparatus capable of providing improved viewing angle characteristic and moire-freeness.

Another object of the present invention is to provide a backlight device for display apparatus, capable of issuing uniform planar illumination light even for a large display area having a diagonal size of 15 inches or larger.

A further object of the present invention is to provide a backlight device for display apparatus, capable of issuing uniform planar illumination light even at a relatively low accuracy of designing of a reflection layer and a disposition density thereof.

A still further object of the present invention is to provide a backlight device for display apparatus capable of preventing an adverse effect of radiation heat from a light source to a display device.

Sill another object of the present invention is to provide an inexpensive but reliable backlight device for display apparatus.

A yet further object of the present invention is to provide a backlight device for display apparatus capable issuing illumination light having uniform spectral characteristic at the illuminated surface.

According to the present invention accomplished in view of the above-mentioned circumstances, there is provided a backlight device, comprising: reflection means for reflecting light, a transmission member disposed opposite to the reflection means so as to form a space from the reflection means, and a light source disposed to emit light into the space, so that light issued from the light source into the space is reflected by the reflection means and transmitted through the transmission member. In this instance, it is preferred that the transmission member is provided with a reflection layer having a multitude of apertures, so that the light issued from the light source into the space is repetitively reflected by the reflection means and the reflection layer to be leaked outwards through the transmission member out of the apertures. It is also preferred that the apertures are arranged to have an area per unit region of the transmission member, which area increases with an increase in distance from the light source. It is further preferred that the reflection means is provided with a scattering layer for scattering and reflecting light on a face of the reflection means opposite to the reflection layer. It is also preferred that the scattering layer is provided with a multitude of apertures arranged to have an area per unit region of the scattering layer, which area decreases with an increase in distance from the light source. It is further preferred that the backlight device further includes a polarization beam splitter supported on the transmission member for selectively transmitting a p-polarization component and reflecting an s-polarization component, and a quarter wave plate disposed on the reflection means and opposite to the transmission member for causing conversion between the p-polarization component and the s-polarization component, whereby light emitted from the light source into the space is reflected between the polarization beam splitter layer and the reflection means so that the p-polarization component of the emitted light is selectively leaked outwards through the transmission member.

According to another aspect of the present invention, there is provided a backlight device, comprising:

a first reflection means for reflecting light, a second reflection means disposed opposite to the first reflection means so as to form a space therebetween and provided with apertures having a prescribed aperture ratio distribution, at least one linear light source disposed to emit light into the space, and at least one sheet of prism means having a multitude of prism ridges extending parallel with the linear light source, so that light emitted from the linear light source is repetitively reflected between the first and second reflection means, and a portion of the light is transmitted through the second reflection means and the prism means to be emitted in a direction deflected toward a normal to the prism means.

According to the present invention, there is further provided a display apparatus, comprising:

a backlight device as described above, a backlight drive means for driving the backlight device, a display device, particularly a liquid crystal display device, illuminated by the backlight device, and a drive means for driving the display device.

These and other objects, features and advantages of the present invention will become more apparent upon a consideration of the following description of the preferred embodiments of the present invention taken in conjunction with the accompanying drawings, wherein like parts are denoted by like reference numerals.

BRIEF DESCRIPTION OF THE DRAWINGS

FIGS. 6 and 7 are graphs showing an aperture ratio distribution in a reflection layer and a luminance distribution, respectively, of a fifth embodiment of the backlight device according to the invention.

FIG. 9 is a schematic exploded illustration of the sixth embodiment of the backlight device according to the invention.

FIG. 10 is a graph showing an aperture ratio distribution of a prism sheet in the sixth embodiment of the backlight device according to the invention.

FIG. 11A and 11B are graphs showing viewing angle-dependence of luminance in cases of using one prism sheet and two prism sheets, respectively, in the sixth embodiment of the backlight device.

FIG. 12 is a graph showing a planar luminance distribution in the sixth embodiment of the backlight device.

FIG. 15 is a graph showing a viewing angle-dependence of luminance regarding the effect of the 8th embodiment.

FIG. 16 is a sectional view for illustrating a position of diffusion means.

FIGS. 19 and 20 are respectively a block diagram of a display apparatus using a backlight device according to the invention.

FIGS. 22 and 23 are respectively a plan view showing a preferred reflection layer pattern.

DESCRIPTION OF THE PREFERRED EMBODIMENTS

A preferred embodiment of the backlight device according to the present invention will be described with reference to FIG. 1, an exploded perspective view thereof.

Figure 1:
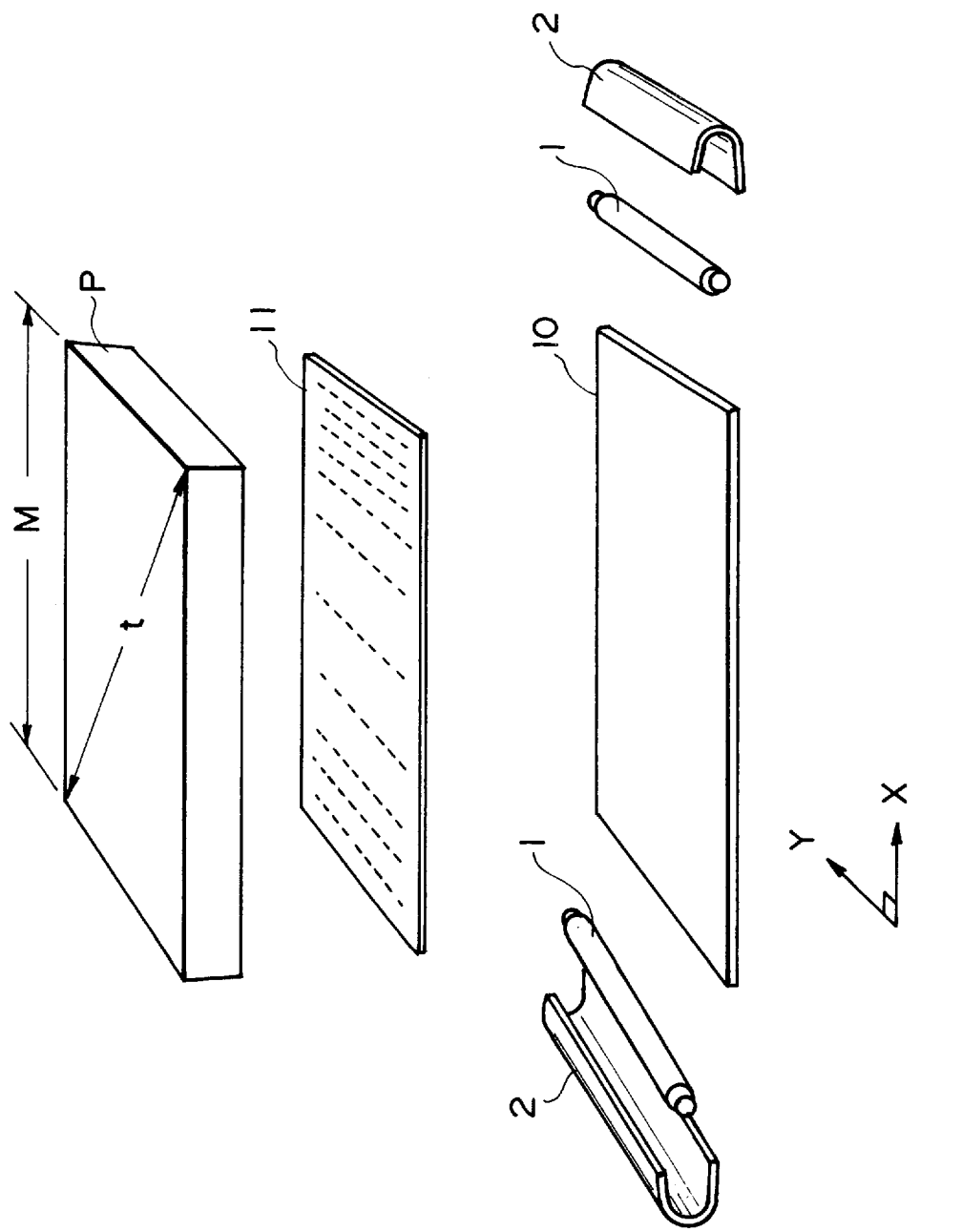
FIG. 1 is a schematic exploded illustration of a backlight device according to the present invention.

Referring to FIG. 1, a transmission-type display device P is illuminated by a backlight device according to the invention including light sources 1, reflectors 2, a reflection means 10 and a transmission member 11 having a pattern of reflection layer.

The light sources are disposed outside the display device P to form an edge-type or (H-arrangement)-type backlight device. In other words, when the light light sources 1 are constituted by a pair of lamps, the lamps are disposed with a spacing of at least M which is a lateral length of the display device P.

The light source 1 may be any light source having a spectral distribution desired by the display device P. Specific examples thereof may include LEDs, halogen lamps, xenone lamps and white fluorescent lamps. Particularly, for a display device having three types of pixels of red (R), green (G) and blue (B), it is preferred to use a three-wavelength type white fluorescent lamp having a spectral characteristic of providing emission peaks in the regions of R, G and B, respectively.

The reflectors 2 and reflecting means 10 may for example comprise a metal member having a reflecting inner surface or a light-absorbing or light-transmissive substrate coated with a reflective material forming an inner surface.

The transmission member 11 may comprise a light-transmissive substrate surface-coated with pattern of reflection layer. The reflection layer pattern may preferably have apertures (portions free from the reflection layer) occupying an areal ratio (i.e., aperture ratio) which increases with an increase in distance in X-direction from a light source 1. In the embodiment of FIG. 1 having two light sources 1 at both ends in the X-direction, the aperture ratio is determined based on distances of 0 to M/2 from the light sources at the left and right ends.

The reflection layer may have a pattern of a multitude of reflective portions various shapes, such as circles ellipses, squares, rectangles, lozenges, parallelograms, trapezoids and starts. Alternatively, as a negative or complementary pattern to the above-mentioned reflective portions, the apertures can assume various discrete shapes as descried above.

The display device P may suitably comprise a liquid crystal device, examples of which may include: STN-type and DSTN-type liquid crystal devices using nematic liquid crystals; active matrix-type liquid crystal devices using thin-film transistors or MIM-elements; and ferroelectric liquid crystal devices and anti-ferroelectric liquid crystal devices using chiral smectic liquid crystals.

In the case of a liquid crystal device using a chiral smectic liquid crystal, there has been reported a liquid crystal molecular movement resulting in a change in liquid crystal layer thickness and causing a yellow-tinging or a display area (U.S. Pat. No. 5,381,256). Accordingly, if the spectral characteristic of illumination light is changed to have a yellowish tint, the yellow tinging is liable to be enhanced. For this reason, it is preferred to use a backlight device of the present invention free from spectral characteristic change in combination with a chiral smectic liquid crystal device for obviating the above difficulty.

Figure 8:
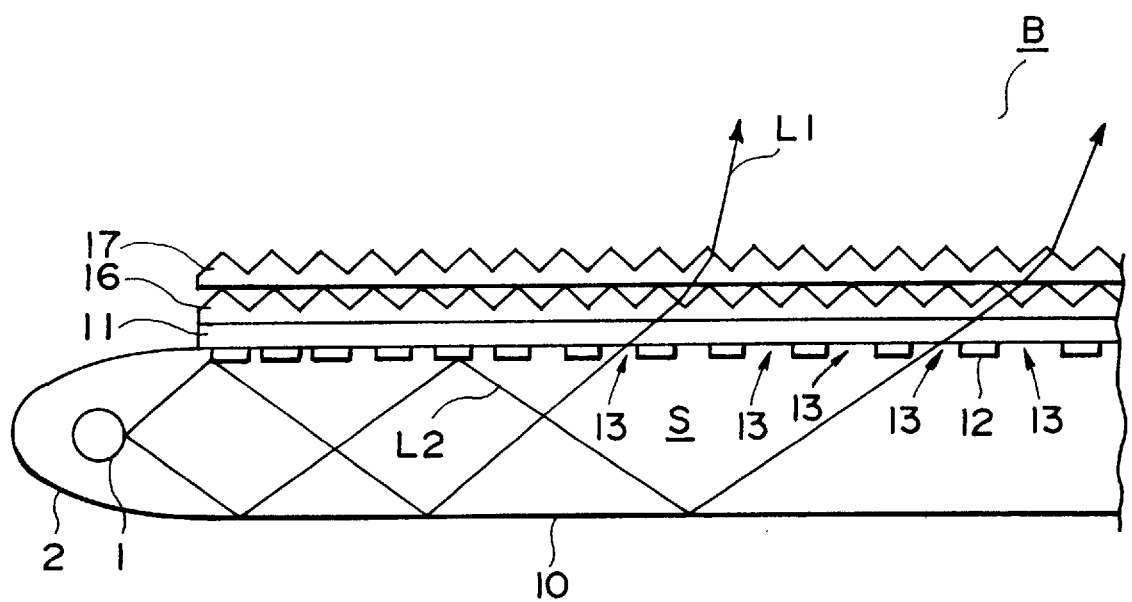
FIG. 8 is a sectional view for illustrating a sixth embodiment of the backlight device according to the invention.

In addition to the structure shown in FIG. 1, the backlight device according to the present invention may preferably further comprise a prism sheet so as to have the direction of light issuance therefrom approach a planar normal. In this instance, it is particularly preferred to use a plurality of prism sheets so that their convex surfaces are directed toward a display device side as will be described with reference to FIG. 8 or use a prism sheet disposed to have its convex surface directed toward a reflecting means 10 as will be described with reference to FIG. 14. Further, it is also possible to provide the reflecting means with a reflecting surface shaped so as to reduce the number of reflections thereat as will be described with reference to FIGS. 17 and 18, while a shaping step may be additionally required thereby.

Figure 2:
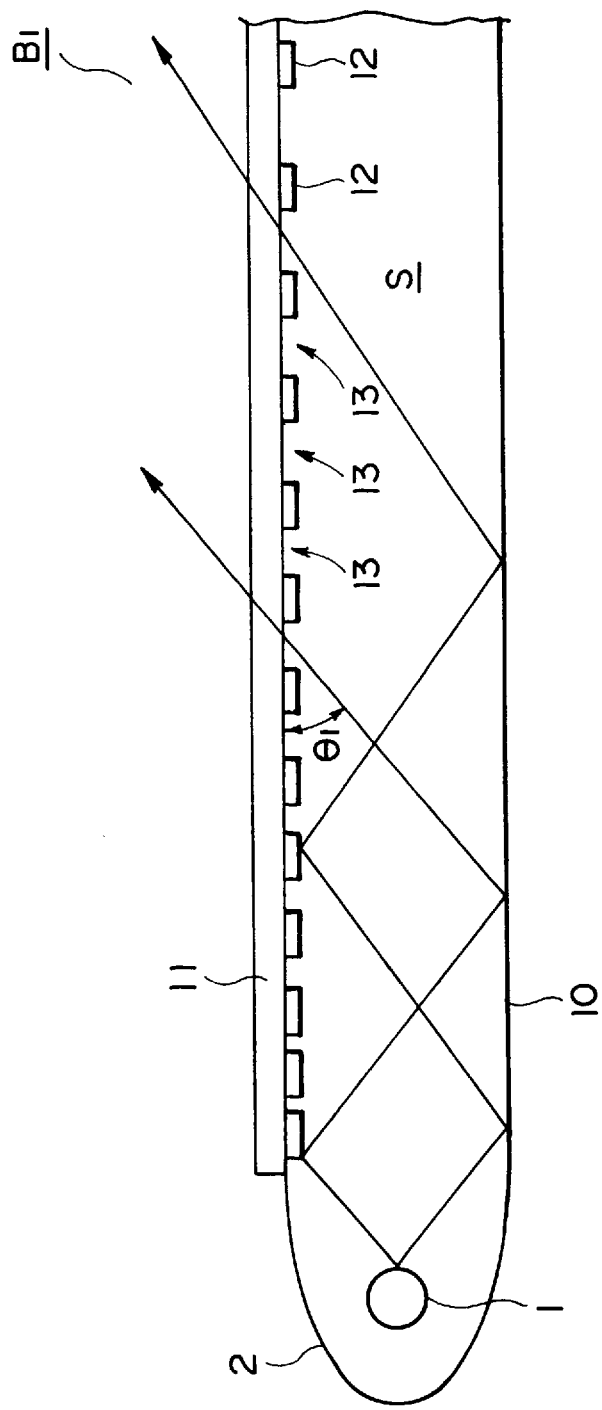
FIGS. 2–5 are sectional views for illustrating first to fourth embodiments, respectively, of backlight device according to the invention.

An embodiment of backlight device $B_1$ shown in FIG. 2 is provided with a rear reflecting plate (reflection means) 10 composed of an aluminum plate. The rear reflecting plate 10 has a mirror-finished surface so as to reflect light incident thereto. The reflecting plate is integrally formed with reflectors 2 having a concave surface composed also of an aluminum plate. In front of the rear reflecting plate 10, a front transmission plate (transmission member) 11 of a thin transparent acrylic resin plate is disposed with a spacing from and in parallel with the reflecting plate 10, so that a space S is defined by the rear reflecting plate 10 and the front transmission plate 11. At the lateral ends (e.g., the parts surrounded by the reflectors 2), three wavelength-type fluorescent lamps 1 as linear light sources are disposed so that light emitted therefrom enters the space S directly or indirectly after reflection by the reflector 2.

On the other hand, on the lower surface (i.e., opposite to the rear reflection plate 10) of the front transmission plate 11, a reflection layer 12 of, e.g., vapor-deposited aluminum is disposed in a pattern of a mesh or various discrete shapes as described above to form a multitude of apertures 13, out of which light is allowed to leak out through the front transmission plate 11.

In this embodiment, the apertures 13 are arranged to have an aperture ratio k(x), i.e., a ratio of an area occupied by the apertures 13 per unit region of the front transmission plate 11 at a position disposed at a distance x from the nearest fluorescent lamp 1, which aperture ratio increases with an increase in the distance x, e.g., in a relationship of $1-k(x) = a/x$, wherein a is a proportional constant.

Above the front transmission plate 11 is disposed a transmission-type liquid crystal panel (not shown) so that the liquid crystal panel is illuminated with the light issued from the backlight device $B_1$.

When the fluorescent lamp 1 is turned on, light emitted from the fluorescent lamp enters the space S directly or after being reflected by the reflector 2. The light having entered the space is repetitively reflected by the reflecting layer 12 and the rear reflection plate 10 disposed opposite to each other, so that the space S functions as a light-guide space.

Then, a portion of the light is leaked out through the apertures 13 of the reflection layer 12 and the transparent plate 11 to illuminate a liquid crystal panel (not shown) disposed above the plate 11.

The angle (denoted by "$\theta_1$" in FIG. 2) of light incident to the transmission plate 11 becomes smaller as the position leaves away from the fluorescent lamp 1 so that leakage quantity of the light becomes smaller in proportion to almost the angle $\theta_1$, if the aperture ratio k is constant. In this embodiment, however, the aperture ratio k(x) of the reflection layer 12 is set to be larger as the distance x increases, so that the leakage light quantities at various positions become substantially equal. As a result, the planar luminance distribution of the leakage light (illumination light) from the backlight device $B_1$ becomes uniform to provide an improved display quality to the liquid crystal panel.

In this embodiment, the light-guide member 3 (FIG. 21) required in the conventional device is omitted, so that the backlight device becomes lighter in weight by that much and provides an improved portability to even a large-area display apparatus.

A second embodiment of the backlight device according to the present invention will now be described with reference to FIG. 3, wherein parts identical to those shown in FIGS. 1 and 2 are denoted by identical reference numerals and descriptions thereof may be omitted.

In this embodiment, a front surface (opposite to a transmission plate 11 and a reflection layer 12) of a rear reflection plate 10 is provided with a scattering layer 20. The scattering layer 20 may be composed of a printed layer of a white pigment, such as barium sulfate, calcium carbonate or titanium oxide and, likewise the reflection layer 12, may be formed in a mesh pattern or a discrete dot pattern so as to provide a multitude of apertures 21. The aperture ratio $k_1(x)$ of the scattering layer 20 is set to be smaller as the distance from the fluorescent lamp increases, in contrast to the case of the reflection layer 12.

When the fluorescent lamp 1 is turned on, emitted light is repetitively reflected between the rear reflecting plate 10 and the reflection layer 12, and light incident to the scattering layer 20 is reflected as scattered light. Then, the light having repeated the reflection and scattering is leaked out through the apertures 13 of the reflection layer 12.

In this embodiment, similarly as in the previous embodiment, the aperture ratio k(x) of the reflection layer 12 is set to be larger as the distance x from the fluorescent lamp 1 becomes larger, so that the leakage light quantities at various positions become almost equal. As a result, the leakage light (illumination light) from the backlight device $B_2$ is caused to have a uniform planar luminance distribution, thereby providing an improved display quality to the liquid crystal panel.

Further, in this embodiment, light in the space S is scattered by the scattering layer 20 formed on the surface of the rear reflecting plate 10. As a result, even if the incident angle $\theta_2$ of light incident to the scattering layer 20 is small, the light scattered from the scattering layer 20 can enter the front transparent plate 11 at a larger incident angle $\theta_3$, so that the incident angle $\theta_3$ can be uniform and less dependent on the distance from the fluorescent lamp 1, and leakage light quantities at various positions become almost uniform because of such uniformized angle characteristic. Accordingly, the planar luminance distribution of the leakage light (illumination light) is uniformized to provide an improved display quality to the liquid crystal panel.

In an H-type (or edge-type) backlight device like this embodiment, the incident light angle $\theta_2$ becomes smaller as the position is left away from the fluorescent lamp 1. However, in this embodiment, the aperture ratio $k_1(x)$ of the scattering layer is set to be smaller so as to provide a larger occupation areal ratio $(1-k_1(x))$ of the scattering layer 20 as the position is left away from the fluorescent lamp. As a result, light having a smaller incident angle $\theta_2$ is more frequently scattered. Then, the scattered light is incident to the transmission plate 11 at a larger incident angle $\theta_3$ to be more readily leaked out through the apertures 13 of the reflection layer 2. As a result, leakage light quantities at various positions of the backlight device is uniformized, so that the planar luminance distribution of the leakage light (illumination light) becomes uniformized to provide an improved display quality. Thus, the backlight device can exhibit an improved performance for a larger area display apparatus.

Figure 3:
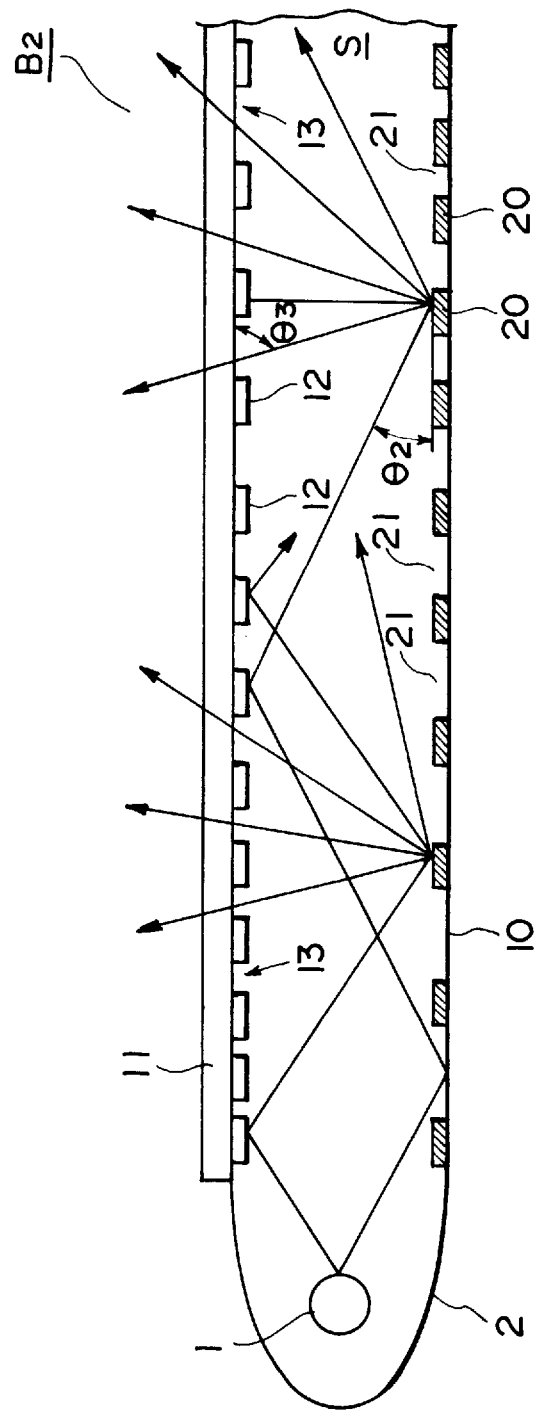

A third embodiment of the backlight device according to the present invention will now be described with reference to FIG. 4, wherein parts identical to those shown in FIGS. 1 to 3 are denoted by identical reference numerals and descriptions thereof may be omitted.

Figure 4:
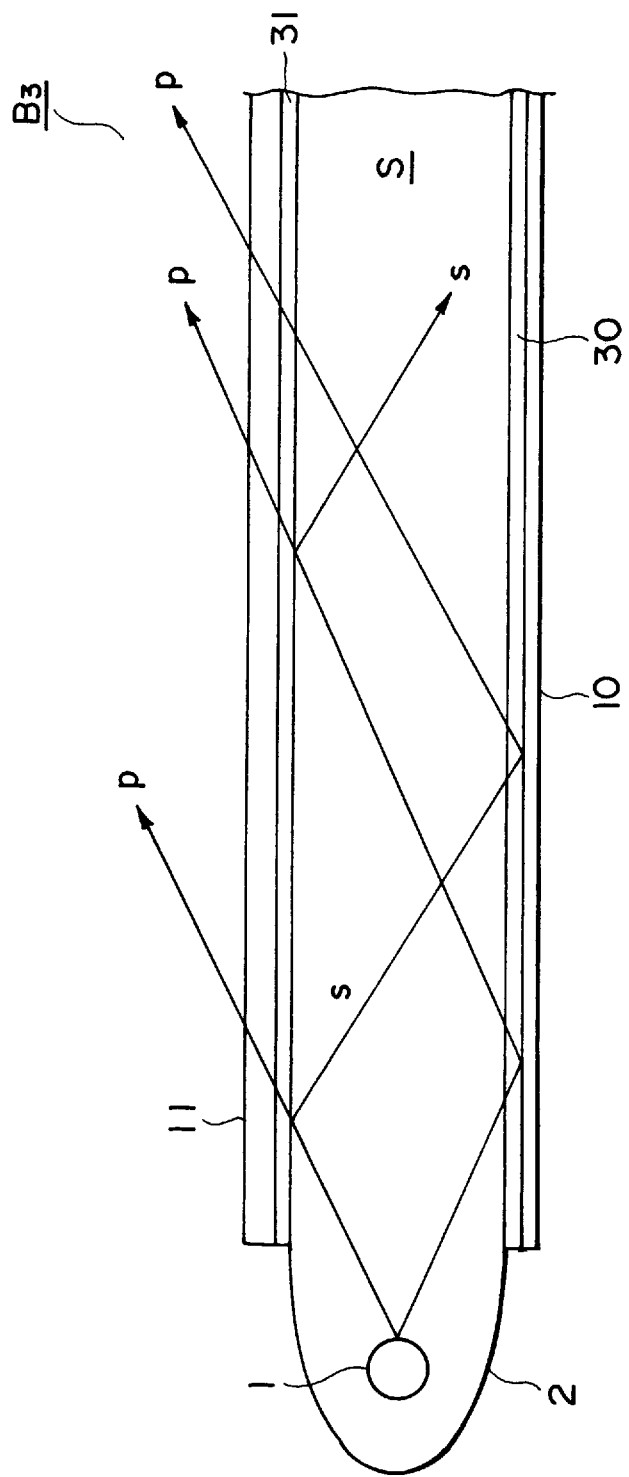

In this embodiment, a front surface (upper surface) of a rear reflection plate 10 is provided with a $\lambda/4$ plate 30 for effecting plarization conversion between an s-polarization component (light component having an electric field component perpendicular to the drawing sheet of FIG. 4) and a p-polarization component (light component having an electric field component parallel to the drawing sheet of FIG. 4), and a lower surface of a front transmission plate 11 is provided with a polarization beam splitter layer 31 of an optical multi-layer film, which allows the transmission of only the p-polarization component and reflects the s-polarization component. In this embodiment, a liquid crystal panel (not shown) disposed above the plat 11 is designed to receive the p-polarized light as illumination light.

When the fluorescent lamp 1 is turned on, emitted light is repetitively reflected between the rear reflecting plate 10 and the polarization beam splitter layer 31, and a p-polarization component of the light incident to the polarization beam splitter layer 31 is transmitted through the layer 31 and the front transmission plate 11 to be leaked outwards. On the other hand, the remaining s-polarization component is reflected by the polarization beam splitter layer 31 and then incident to and reflected by the rear reflection plate 10 where the s-polarization is converted to p-polarization because it passes twice the $\lambda/4$ plate 30. The resultant p-polarization component is transmitted through the polarization beam splitter layer 31 and the front transmission plat 11 to be leaked outwards.

As the liquid crystal panel is designed to receive a p-polarized light in this embodiment, the illumination efficiency of the backlight device can be remarkably improved.

Figure 5:
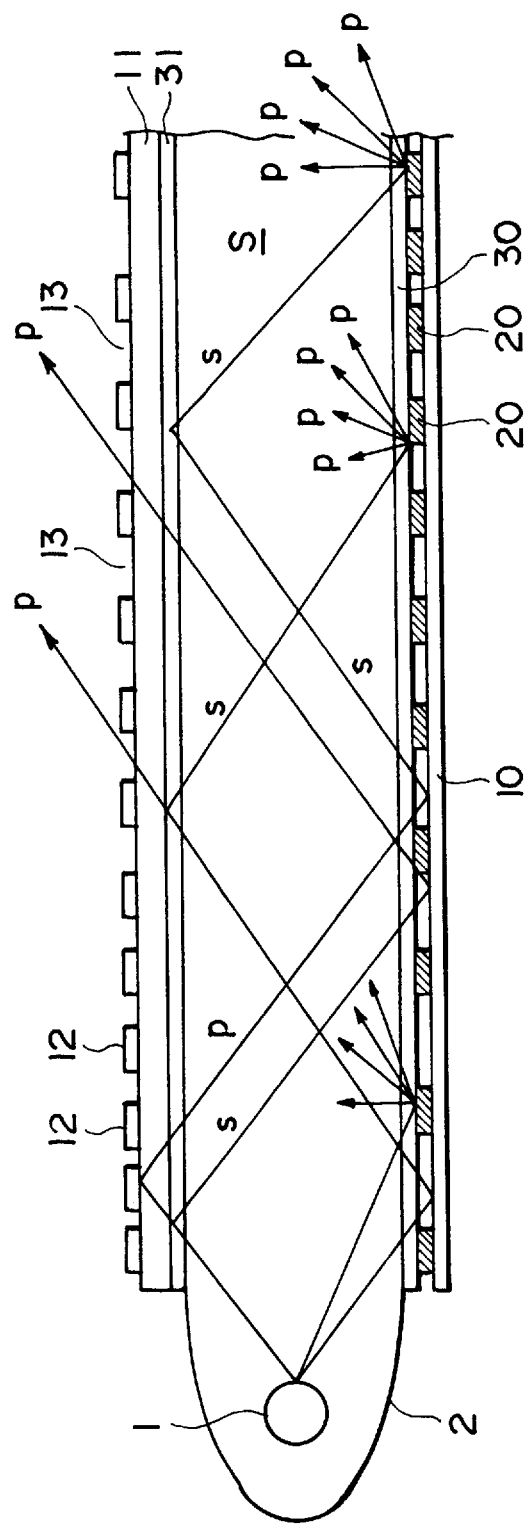

Next, a fourth embodiment of the backlight device according to the present invention will be described with reference to FIG. 5 wherein parts identical to those shown in FIG. 4 are denoted by identical reference numerals.

In this embodiment, a front transmission plate 11 is composed of a transparent glass plate and the front surface of the front transmission plate 11 is provided with a reflection layer 12. Further, between a rear reflection plate 10 and a $\lambda/4$ plate 30, a scattering layer 20 is disposed. The reflection layer 12 is formed in a dot pattern or a mesh pattern so as to have an aperture ratio $k(x)$ increasing with an increase in distance from the fluorescent lamp 1 similarly as in the first embodiment, and the scattering layer 20 is formed in a dot or mesh pattern so as to provide a prescribed aperture ratio $k_1(x)$ similarly as in the second embodiment.

When the fluorescent lamp 1 is turned on, an s-polarization component is reflected by a polarization beam splitter layer 31 and is then reflected by a rear reflection plate 10 where it is converted into a p-polarization component. On the other hand, a p-polarization component is transmitted through the polarization beam splitter 31, a portion thereof is leaked out of the apertures 13 to illuminate a liquid crystal panel (not shown) disposed above, and the remaining portion thereof is reflected by the reflection layer 12 to enter the space S again. The portion of the p-polarization component reflected by the reflection layer 12 is converted into an s-polarization component when it is reflected by the rear reflection plate 10. The s-polarization component is again reflected by the polarization beam splitter layer 31 and the rear reflection plate 10, where it is again converted into a p-polarization component allowed to be leaked outwards similarly as the above for illuminating the liquid crystal panel.

As the aperture ratio $k(x)$ of the reflection layer 12 is set to be larger as the distance x from the fluorescent lamp 1 increases, the light leakage quantities at various positions become almost equal, so that the leakage light (illumination light) from the backlight device B is caused to have a uniform planar luminance distribution, thereby providing an improved display quality to the liquid crystal panel.

Further, as light from the fluorescent lamp 1 is scattered by the scattering layer 20, the illumination light angle characteristic is uniformized regardless of the distance from the fluorescent lamp 1 and the leakage light quantities at various positions are made almost equal, so that the planar luminance distribution is uniformized also in this respect to provide an improved display quality of the liquid crystal panel.

Further, as the aperture ratio $k_1(x)$ of the scattering layer 20 is set to be smaller as the distance x from the fluorescent lamp 1 increases, a fraction of light incident at a smaller incident angle $\theta_2$ is more easily scattered, so that the leakage light quantities from various positions of the backlight device are equalized also in this respect, leading to a uniform planar luminance distribution of the backlight device $B_4$ and an improved display quality of the liquid crystal panel.

Further, by disposing the liquid crystal panel so as to receive p-polarized light, the utilization efficiency of the backlight illumination light can be remarkably improved.

While no particular explanation has been made regarding the above-mentioned embodiments, it is possible to provide the upper surface of the front transmission plate 11 with a diffusion treatment or dispose a separate diffusion plate on the upper surface. Particularly, in the fourth embodiment (FIG. 5), it is possible to dispose a diffusion plate above the reflection layer 12, whereby light issued from the front transmission plate 11 is diffused to alleviate an light intensity distribution due to a dot-pattern or mesh-pattern arrangement of the reflection layer 12, so as to moderate the pattern of the reflection layer 12.

In the embodiments of FIGS. 2–5, only the fluorescent lamp 1 is indicated but it is possible to dispose an additional fluorescent lamp at a position opposite to the fluorescent lamp 1 so as to dispose the reflection plate 10 and the transmission plate 11 between the resultant pair of fluorescent lamps similarly as shown in FIG. 1. Further, the number of fluorescent lamps is not limited to 2 but may be 4 so as to surround the space S. By this arrangement, it is possible to provide a backlight device with an increased luminous intensity.

Further, in the fourth embodiment (FIG. 5), the reflection layer 12 is disposed on the upper surface of the front transmission plate but this is not limitative. For example, a reflection layer may also be disposed on a lower surface (confronting with the λ/4 plate 30) of the front transmission plate 11.

Next, a fifth embodiment will now be described, which is a modification of the first embodiment wherein the aperture ratio of the reflection layer 12 is changed in a manner described hereinafter.

Regarding the aperture ratio distribution of a reflection layer 12, we have made an examination of three types as shown in FIG. 6 wherein a curve α representing a linear relationship, a curve γ representing a hyperbolic relationship and a curve β representing a relationship intermediate therebetween (with respect to a left half of a laterally symmetrical structure), wherein the abscissa represents a distance x from a lamp 1 and the ordinate represents an aperture ratio Ap of the reflection layer 12. More specifically, in this instance, a structure as shown in FIG. 2 was supplemented with a symmetrical right half so that two fluorescent lamps were disposed at both lateral sides between which a light-guide space S was disposed. As a result, luminance distributions as shown in FIG. 7 were obtained for the respective cases (only left halves being indicated). The results show that the relationship β representing an intermediate function between a linear one and a hyperbolic one regarding a distance x and an aperture ratio thereat, resulted in a best uniformity of luminance distribution. However, the linear relationship α and the hyperbolic relationship γ could also be regarded as practically acceptable without providing a detrimental difference.

As described above, according to the first to fifth embodiments of the present invention, it has been possible to provide a backlight device which is light and excellent in portability.

Further, by adopting an arrangement allowing repetitive reflection of light between a reflection means and a reflection layer, so as to have the light leak out of apertures formed in the reflection layer, it has become possible to provide a backlight device which provides a uniform planar luminance distribution even without a light-guide member, is light and is excellent in portability.

Further, in case where the apertures in the reflection layer are arranged to have an aperture ratio which increases with an increase in distance from a light source, the light leakage quantities at respective positions are substantially equalized to provide a uniform planar luminance distribution of leakage light (illumination light).

Further, in case where the reflection means is provided with a scattering layer for scattering and reflecting light incident thereto, the angle characteristic of issued light can be uniformized to equalize the leakage light quantities, thereby providing a uniform planar luminance distribution of illumination light.

Further, in case where the scattering layer is provided with a multitude of apertures providing an aperture ratio which decreases with an increase in distance from the light source, a light fraction having a smaller incident angle is subjected to a promoted scattering to increase the light leakage through the apertures of the reflection layer thereat. This also promotes the equalization of leakage lights from the backlight device leading to a uniform planar luminance distribution of illumination light.

Further, in case where emitted light is reflected between a polarization beam splitter layer and a reflection means and only one type of polarization component (e.g., p-polarization component) is allowed to issue as illumination light, the utilization efficiency of illumination light can be remarkably increased.

Further, by using a backlight device described above for illuminating a liquid crystal display device, it is possible to provide an information transmission apparatus or display apparatus with excellent display quality.

A sixth embodiment of the present invention will be described with reference to FIGS. 8–12.

A backlight device B according to this embodiment includes the fluorescent lamps 1 as linear light sources, which are disposed opposite to each other with a spacing therebetween and so as to be covered with reflectors 2 as shown in FIG. 9.

A rear reflecting plate (first reflection means) 10 is disposed integrally with the reflectors 2, which are integrally composed of an aluminum plate so as to reflect emitted light from the fluorescent lamps 1. A front transmission plate 11 is disposed in parallel with the rear reflection plate 10. The front transmission plate 11 may be composed of a relatively thin transparent acrylic resin plate. Further, on the lower surface of the front transmission plate 11, a reflection layer (second reflection means) 12 is disposed opposite to the rear reflecting plate 10 with a space S therebetween. The reflection layer 12 may be formed of, e.g., a vapor-deposited aluminum film in a mesh or dot pattern so as to provide apertures designed to have a prescribed aperture ratio distribution. The aperture ratio of the apertures is designed to increase with an increase in distance from the nearest fluorescent lamp 1. More specifically, the aperture ratio Ap is designed to satisfy a relationship represented by a curve β in FIG. 10 which is intermediate between a linear relationship a and a parabolic relationship γ in FIG. 10, with respect to the distance x from the lamp 1.

Thus, the fluorescent lamps 1 are disposed to emit light toward a prescribed space S formed between the rear reflection plate 10 and the reflection layer 12. The space S functions as a light-guide space for directing the emitted light from the fluorescent lamps 1 upwards in the drawing. Further, as the reflection layer 12 is formed to provide an aperture ratio as described above, a portion of light L1 (FIG. 8) is transmitted through the reflection layer 12 and the remaining portion of light L2 is reflected toward the rear reflection plate 10.

On the other hand, above the front transmission plate 11, two prism sheets (prism means) 16 and 17 provided with a multitude of prism elements each having an apex angle of 90 degrees. The prism elements are disposed so that their ridges providing apex angles extend in parallel with the longitudinal direction of the fluorescent lamp 1 and the apex angles are disposed on a reverse side (upwards) with respect to the rear reflection plate 10 of the transmission plate 11. Above the prism sheets 16 and 17, a liquid crystal panel (not shown) to be illuminated is disposed.

Based on the above-described structure, when light is emitted from a lamp 1, the emitted light is repetitively reflected between the rear reflecting plate 10 and the reflection layer 12 to proceed in the space S. Then, a portion of light L1 is transmitted through the apertures 13 having a prescribed aperture ratio in the reflection layer 12 and is further transmitted through the prism sheets 16 and 17 to be issued in a direction deflected toward a normal to the prism sheets 16 and 17. In this instance, the leakage light quantities at various positions of the reflection layer 12 are adjusted by the aperture ratio distribution therein to provide illumination light having a uniform planar luminance distribution.

In this embodiment, the prescribed space S formed between the rear reflection plate 10 and the reflection layer 12 is utilized as a light-guide space to omit a thick acrylic resin plate conventionally used, the backlight device is decreased in weight by that much.

In this embodiment, as an acrylic resin plate functioning as a light-guide member is not used, even a light component having a large emission angle is allowed to be emitted through the transmissions plate 11 without causing total reflection. In this embodiment, as the two prism sheets 16 and 17 are used, however, the light L1 transmitted through the transmission plate 11 is deflectively emitted in a direction deflected toward a normal to the prism sheets 16 and 17, so that the viewing angle characteristic (or light emission angle characteristic) of the backlight device is improved. More specifically, in case of a single prism sheet, the luminance distribution of light from a backlight device assumes peaks at emission angles (viewing angles) of ±60° C. as shown in FIG. 11A, thus showing an insufficient light-condensing performance and failing to provide an improved viewing angle characteristic. In case of using two prism sheets as in this embodiment, however, the light-condensing performance is improved to provide an improved viewing angle characteristic as shown in FIG. 11B.

Also in this embodiment, the aperture ratio distribution in this embodiment is set as represented by a curve β in FIG. 10, and a uniform luminance distribution as represented by a curve β in FIG. 12 can be attained.

Figure 13:
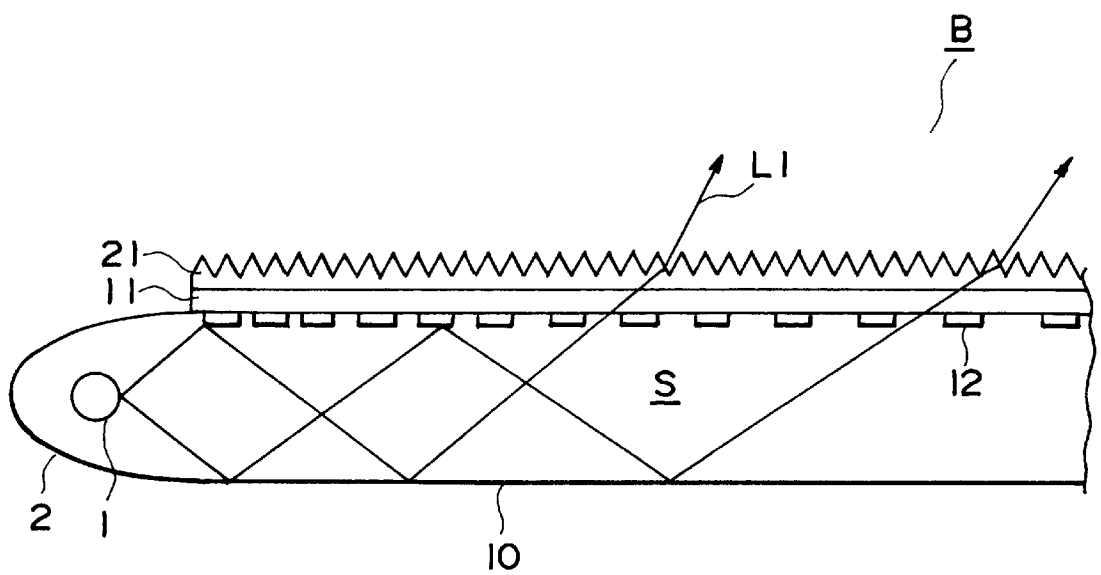
FIGS. 13 and 14 are sectional views for illustrating 7th and 8th embodiments of the backlight device according to the invention.

A seventh embodiment of the present invention will now be described with reference to FIG. 13.

A backlight device B according to this embodiment is provided with one prism sheet (prism means) 21 having a multitude of prism elements each having an apex angle of 60 degrees thereon. The prism elements are disposed so that their ridges providing the apex angles extended in parallel with the longitudinal direction of the fluorescent lamp 1 and the apex angles are directed upwards (toward a liquid crystal panel (not shown) and against the rear reflection plate 10).

The reflection layer 12 is similarly set to have an aperture ratio distribution represented by a curve β in FIG. 10, and the other arrangements are also similar to those adopted in the previous sixth embodiment.

In this embodiment, as no acrylic resin plate functioning as a light-guide member is used, even a light component having a large emission angle is allowed to be transmitted through the transmission plate 11 toward the liquid crystal panel disposed thereabove without total reflection. In this embodiment, however, the prism sheet 21 having an apex angle of 60 degrees is used, so that light L1 transmitted through the transmission plate 11 is refractively deflected in a direction deviated toward a normal to the prism sheet 21, so that the viewing angle characteristic of the backlight device is improved similarly as in the previous sixth embodiment. Further, as a single prism sheet is used in this embodiment, the cost and the weight of the backlight device are reduced.

Similar effects as in the previous embodiment are attained in this embodiment. More specifically, the space S formed between the rear reflection plate 10 and the reflection layer 12 is utilized as a light-guide space to omit a thick acrylic resin plate conventionally used as a light-guide member, so that the weight is reduced by that much. Further, as the aperture ratio distribution in the reflection layer 12 in this embodiment is set to satisfy the curve β in FIG. 10, the resultant planar luminance distribution becomes uniform as represented by the curve β in FIG. 12.

An eighth embodiment of the present invention will now be described with reference to FIGS. 14 and 15.

Figure 14:
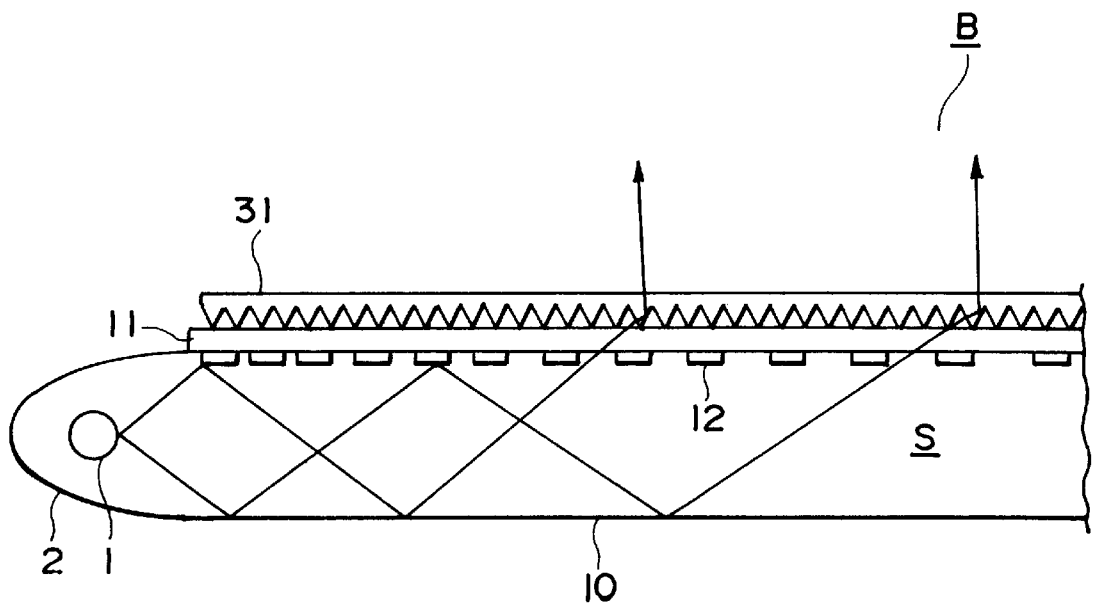

A backlight device B according to this embodiment is provided with one prism sheet (prism means) 31 having a multitude of prism elements each having an apex angle of 60 degrees thereon as shown in FIG. 14. The prism elements are disposed so that their ridges providing the apex angles extended in parallel with the longitudinal direction of the fluorescent lamp 1 and the apex angles are directed downwards (toward the front transmission plate 11 and the rear reflection plate 10).

The reflection layer 12 is similarly set to have an aperture ratio distribution represented by a curve β in FIG. 10, and the other arrangements are also similar to those adopted in the previous sixth embodiment.

In this embodiment, as no acrylic resin plate functioning as a light-guide member is used, even a light component having a large emission angle is allowed to be transmitted through the transmission plate 11 toward the liquid crystal panel disposed thereabove without total reflection. In this embodiment, however, the prism sheet 31 having an apex angle of 60 degrees directed downwards is used, so that light L1 transmitted through the transmission plate 11 is deflected and emitted in a direction close to a normal to the prism sheet 31, so that the viewing angle characteristic of the backlight device is improved as shown in FIG. 15. This is because light transmitted through the front transmission plate 11 is totally reflected at surfaces near the apexes of the prism sheet 31 and deflected toward the normal to the prism sheet 31. Further, as a single prism sheet is used in this embodiment, the cost and the weight of the backlight device are reduced.

Similar effects as in the previous sixth embodiment are attained in this embodiment. More specifically, the space S formed between the rear reflection plate 10 and the reflection layer 12 is utilized as a light-guide space to omit a thick acrylic resin plate conventionally used as a light-guide member, so that the weight is reduced by that much. Further, as the aperture ratio distribution in the reflection layer 12 in this embodiment is set to satisfy the curve β in FIG. 10, the resultant planar luminance distribution becomes uniform as represented by the curve β in FIG. 12.

Incidentally, while no particular description has been made regarding the above-mentioned sixth to eighth embodiments, it is possible to provide the upper surface of the front transmission plate 11 with a diffusion treatment, whereby a uniform luminance of illumination light can be attained regardless of the aperture pattern of the reflection layer 12. Further, in addition to or in place of such a diffusion treatment to the upper surface of the front transmission plate 11, it is also possible to dispose a diffusion plate or sheet on the front transmission plate 11 or the upper prism sheet 17. Further, it is also possible to dispose a diffusion means 61, such as a diffusion plate or sheet, between the two prism sheets 16 and 17 as shown in FIG. 16. By this arrangement, it becomes possible to alleviate a moire pattern caused by superposition of the two prism sheets 16 and 17.

In the above sixth to eighth embodiments, a pair of fluorescent lamps 1 are disposed opposite to each other but this is of course not limitative. For example, it is possible to dispose a fluorescent lamp 1 on one side of the light-guide space S and dispose a reflection plate on the other side opposite to the fluorescent lamp 1. By this arrangement, the backlight device can be reduced in size and weight. In the above embodiments, two fluorescent lamps 1 are used, but four fluorescent lamps can be used so as to surround the light-guide space S. In this case, however, it is preferred to dispose two prism sheets in superposition so that the prism ridges on one prism sheet extend longitudinally (in the thickness of the drawing sheet as shown) and the prism ridges on the other prism sheet extend laterally, i.e., the prism ridges on the prism sheets cross each other at right angles. In this case, it is also preferred that the aperture ratios in the reflection layer 12 are caused to have a two-dimensional distribution. By this arrangement it is possible to easily accomplish a further luminance increase.

In the above sixth to eighth embodiments, the aperture ratio of the reflection layer 12 is set to have a distribution represented by the curve β in FIG. 10, but this is not limitative. For example, the aperture ratio distribution can be linear as represented by a curve α in FIG. 10 or parabolic as represented by a curve γ in FIG. 10. In either case, a substantially uniform planar luminance distribution can be attained as shown by curves α and γ in FIG. 12.

In the above seventh and eighth embodiments (FIGS. 13 and 14), the prism sheets having a prism apex angle of 60 degrees are used, but the apex angle can be any angle below 90 degrees, preferably in the range of 50–70 degrees.

According to the above sixth to eighth embodiments, light emitted from a linear light source is caused to enter a space formed between first and second reflection means where no light-guide member like that of a thick acrylic resin plate is disposed. Accordingly, the backlight device can be reduced in weight by omission of such a light-guide member.

The light transmitted through (the apertures of) the second reflection means is deflected into a direction which is closer to a normal to the prism means, whereby the viewing angle characteristic of the backlight device can be improved.

The viewing angle characteristic is further improved in case where plural sheets of prism means are used.

Further, if a diffusion means is inserted between such plural sheets of prism means, a moire pattern caused by superposition of plural prism means can be alleviated.

Further, even in case of a single prism means, an improved viewing angle characteristic can be attained if the apex angle is made smaller than 90 degrees, preferably in the range of 50–70 degrees. In this case, if the prism means is disposed so that their apexes are directed toward the first reflection means (i.e., against the illumination object), the viewing angle characteristic is further improved.

Further, if the second reflection means is provided with apertures designed to have a distribution of aperture ratio which increases with an increase in distance from a linear light source, e.g., in a relationship of a linear, a parabolic or an intermediate therebetween, the planar luminance distribution of the backlight device can be uniformized.

By using a backlight device as described above, it is possible to provide a liquid crystal display apparatus which is lighter in weight and excellent in display qualities.

Figure 17:
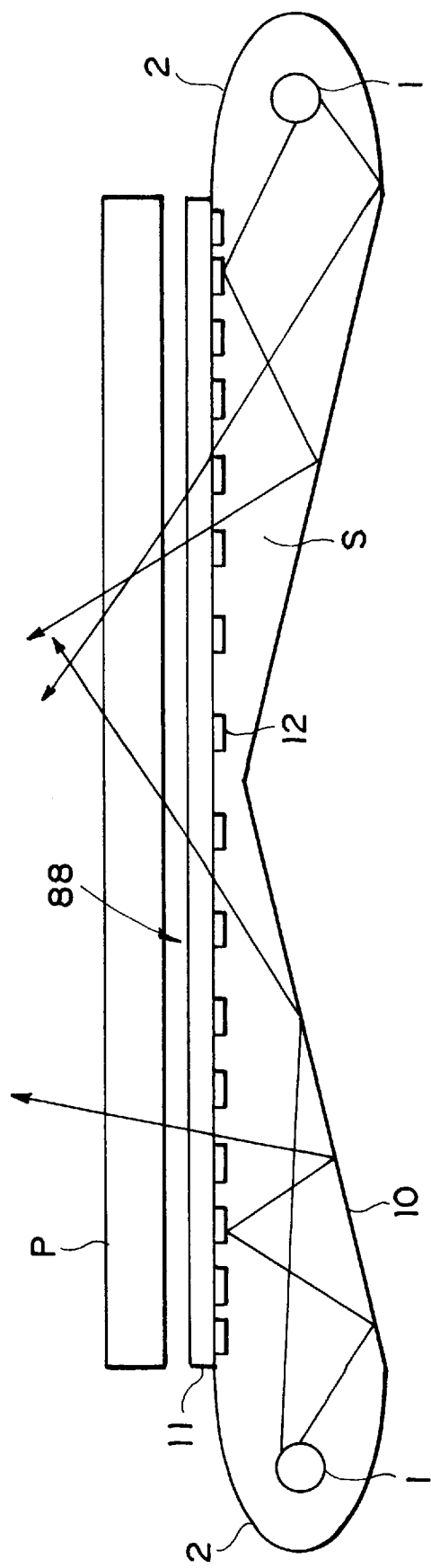
FIGS. 17 and 18 are sectional views for illustrating 9th and 10th embodiments of the backlight device according to the invention.

FIG. 17 is a sectional view of a ninth embodiment of the backlight device according to the present invention. Referring to FIG. 17, a backlight device includes a pair of linear light sources 1, reflectors 2, a rear reflection plate 10 and a front transmission plate 11 of a relatively thin acrylic resin plate. The reflectors 2 and the rear reflection plate 10 are composed integrally of an aluminum plate mirror-finished by a vapor-deposited Ag film. The rear reflection plate 10 is shaped to have a projecting or rising center (ridge) as shown. As a result, a space S defined between the rear reflection plate 10 and the front transmission plate 11 is caused to have a narrower spacing than at the lateral parts in the neighborhood of the light sources 1, and the space S functions as a light-guide space for guiding emitted light from the light sources 1 laterally. An upper side 88 of the front transmission plate 11 functions as an illumination surface, above which a liquid crystal panel P is disposed. The lower surface of the front transmission plate 11 is provided with a reflection layer 12 of vapor-deposited Al in a mesh or dot pattern having a prescribed aperture ratio, which may be referred to as a so-called lighting curtain. The aperture ratio is designed to increase with an increase in distance from the nearest light source 1. An entire structure of the backlight device is laterally almost symmetrical with two light sources 1 on lateral sides of the light-guide space S as shown in FIG. 17.

As a result of the above-described arrangement emitted light from the light sources 1 is repetitively reflected by the rear reflection plate 10 and the reflection layer 12 to proceed toward the center of the light-guides space S. Particularly, in this embodiment, the central portion of the rear reflection plate 10 is projected upwards, so that a portion of the emitted light from the light sources 1 is allowed to reach the center of the light-guide space S by a single reflection at the rear reflection plate 10. In the process of propagation through the light-guide space S, the light is allowed to leak upwards through the apertures in the reflection layer 12, and the resultant leakage light functions as illumination light. Thus, in this embodiment, compared with the previous embodiments, the emitted light reaches the center of the light-guide space S in a smaller number of reflections to be utilized as illumination light, so that the illumination light is less affected by the spectral reflection characteristics of the rear reflection plate 10 and the reflection layer 12 to alleviate color irregularity or deviation between the central part and the peripheral part of the backlight device.

The illumination light quantities at respective positions are adjusted by an aperture ratio distribution in the reflection layer 11, which may preferably be set to have an increasing aperture ratio with an increase in distance from the edges of the light-guide space S on the light source sides toward the center of the space S. Further, it is also possible to dispose a diffusion plate or sheet separately above the front transmission plate 11 so as to observe the pattern of the reflection layer 12 liable to appear on the illumination surface.

The backlight device of this embodiment has a laterally symmetrical arrangement as shown in FIG. 17 and two light sources are disposed on laterally opposite sides of the light-guide space. It is, however, possible to dispose a light source only on a left side of the light-guide space by disposing a reflection means on the right side so as to be opposite to the reflector on the left side. This arrangement may rather be more suitable for a small-size backlight device. On the other hand, it is also possible to dispose light sources on peripheral four sides of the light-guide space by developing the above-described arrangement laterally (as shown) and also longitudinally (in the direction of thickness of the drawing sheet). In this case, it is preferred that the aperture ratios in the reflection layer 12 are also caused to have a two-dimensional distribution. Further, in place of the front transmission plate 11 of an acrylic resin plate having the reflection layer 12, it is also possible to use a PET sheet having an Al reflection layer, i.e., a so-called lighting curtain, so as to attain a similar function.

Figure 18:
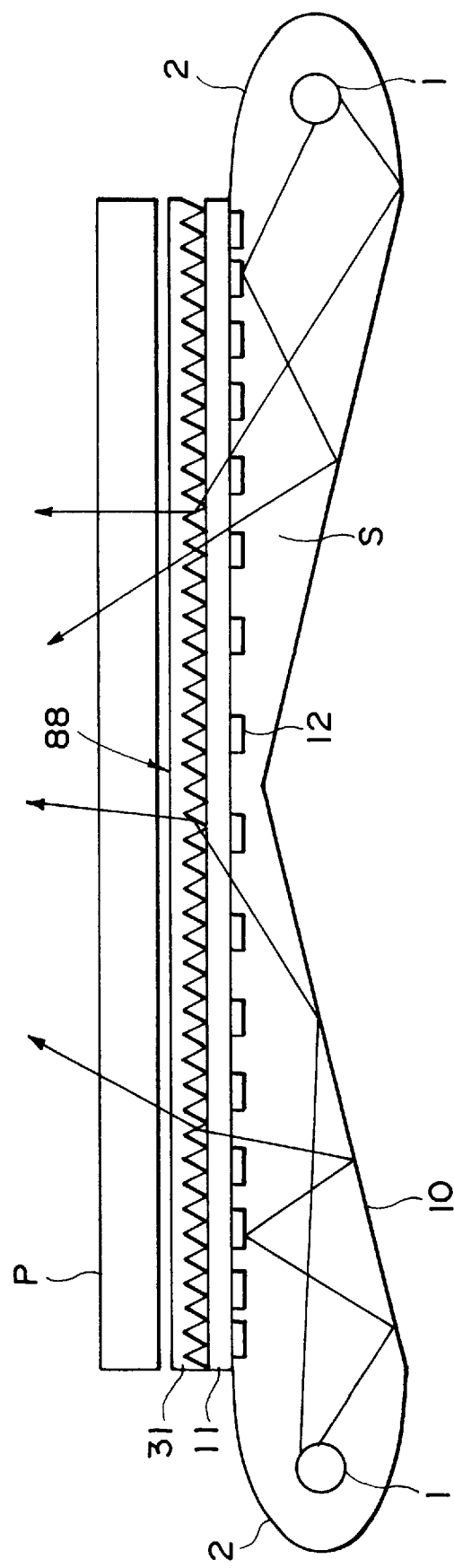

FIG. 18 is a sectional view of a tenth embodiment of the backlight device according to the present invention. Referring to FIG. 18, a backlight device includes a pair of linear light sources 1, reflectors 2, a rear reflection plate 10 and a front transmission plate 11 of a relatively thin acrylic resin plate. The reflectors 2 and the rear reflection plate 10 are composed integrally of an aluminum plate mirror-finished by a vapor-deposited Ag film. The rear reflection plate 10 is shaped to have a projecting or rising center (ridge) as shown. As a result, a space S defined between the rear reflection plate 10 and the front transmission plate 11 is caused to have a narrower spacing than at the lateral parts in the neighborhood of the light sources 1, and the space S functions as a light-guide space for guiding emitted light from the light sources 1 laterally. An upper side 88 of the front transmission plate 11 functions as an illumination surface, above which a prism sheet 31 is disposed. The prism sheet 31 is provided with a multitude of prism elements forming ridges extending parallel with the longitudinal direction of the light sources 1 and having apexes directed downwards (toward the front transmission plate 11. Above the prism sheet 31, a liquid crystal panel P is disposed as an object to be illuminated. The lower surface of the front transmission plate 11 is provided with a reflection layer 12 of vapor-deposited Al in a mesh or dot pattern having a prescribed aperture ratio. The aperture ratio is designed to increase with an increase in distance from the nearest light source 1. An entire structure of the backlight device is laterally almost symmetrical with two light sources 1 on lateral sides of the light-guide space S as shown in FIG. 18.

As a result of the above-described arrangement, emitted light from the light sources 1 is repetitively reflected by the rear reflection plate 10 and the reflection layer 12 to proceed toward the center of the light-guides space S. Particularly, in this embodiment, the central portion of the rear reflection plate 10 is projected upwards, so that a portion of the emitted light from the light sources 1 is allowed to reach the center of the light-guide space S by a single reflection at the rear reflection plate 10. In the process of propagation through the light-guide space S, the light is allowed to leak upwards through the apertures in the reflection layer 12, and the resultant leakage light functions as illumination light, wherein the illumination light quantities at respective positions are adjusted by an aperture ratio distribution in the reflection layer 12, which may preferably be set to have an increasing aperture ratio with an increase in distance from the edges of the light-guide space S on the light source sides toward the center of the space S. The portion of light emitted through the front transmission plate 11 mostly have a large emission angle of around 60 degrees (with respect to a normal to the front transmission plate 11 but may be totally reflected at a prism surface on the prism sheet 31 to be deflected toward a frontal direction of the illumination surface. In this instance, the prism apex angle may preferably be around 60 degrees. Further, it is also possible to dispose a diffusion plate or sheet separately between the front transmission plate 11 and the prism sheet 31 or above the prism sheet 31 so as to observe the pattern of the reflection layer 12 liable to appear on the illumination surface.

Thus, in this embodiment, compared with the previous embodiments, the emitted light reaches the center of the light-guide space S in a smaller number of reflections to be utilized as illumination light, so that the illumination light is less affected by the spectral reflection characteristics of the rear reflection plate 10 and the reflection layer 12 to alleviate color irregularity or deviation between the central part and the peripheral part of the backlight device. Further, as a prism sheet 31 having the above-described function is added, the luminance in the frontal direction is remarkably increased.

The backlight device of this embodiment has a laterally symmetrical arrangement as shown in FIG. 18 and two light sources are disposed on laterally opposite sides of the light-guide space. It is, however, possible to dispose a light source and a light-transmissive sheet member only on a left side of the light-guide space by disposing a reflection means on the right side so as to be opposite to the reflector on the left side. This arrangement may rather be more suitable for a small-size backlight device. On the other hand, it is also possible to dispose light sources on peripheral four sides of the light-guide space by developing the above-described arrangement laterally (as shown) and also longitudinally (in the direction of thickness of the drawing sheet). In this case, it is preferred to dispose two prism sheets in superposition so that the prism ridges on one prism sheet extend longitudinally (in the thickness of the drawing sheet as shown) and the prism ridges on the other prism sheet extend laterally, i.e., the prism ridges on the prism sheets cross each other at right angles. In this case, it is also preferred that the aperture ratios in the reflection layer 12 are caused to have a two-dimensional distribution. Further, in place of the front transmission plate 11 of an acrylic resin plate having the reflection layer 12, it is also possible to use a PET sheet having an Al reflection layer, i.e., a so-called lighting curtain, so as to attain a similar function.

FIGS. 22 and 23 are respectively a plan view showing a preferred reflection layer pattern (aperture pattern) used in the present invention.

The X-Y coordinates in these figures correspond to that shown in FIG. 1, and a larger x represents a larger distance from a light source 1. In these figures, the reflection layer pattern (aperture pattern) is depicted only one-dimensionally in the X-direction but actually the pattern may be repeated in the Y direction.

The reflective layer patterns shown in FIGS. 22 and 23 respectively include a sub-pattern 12a and a sub-pattern 12b. The sub-pattern 12a comprises a continuous masking layer (shown with a hatching, illustrated as discrete square patterns for convenience of illustration but may actually constitute a continuous layer) and discrete apertures having an aperture ratio increasing with an increase in X-coordinate. The sub-pattern 12a is suitable for providing aperture ratios in a range of, e.g., 0–50%. The sub-pattern 12b is a negative (or complementary) pattern with respect to the sub-pattern 12a, i.e., comprises discrete masking layers and a continuous aperture (or opening) area surrounding the masking layers. The sub-pattern 12b is suitable for providing aperture ratios in the range of, e.g., 50–100%. It is clear that the boundary aperture ratio for selection of the sub-patterns 12a and 12b is not necessarily 50%.

In case where a pair of light sources 1 are used as shown in FIG. 1, the patterns of FIGS. 22 and 23 may be formed laterally symmetrically with a line (extending longitudinally) of aperture ratio of 100% at the center.

Some sample backlight devices for a display panel having a diagonal size of 15 inches were prepared and evaluated in the following manner.

More specifically, sample devices a–d were prepared to have structures corresponding to FIGS. 2, 13, 8 and 14, respectively, and provided with white fluorescent lamps 1 each having a broad spectral characteristic over the regions of R, G and B.

Sample devices were prepared similarly to have structures corresponding to FIGS. 2, 13, 8 and 14, respectively, but provided with three wavelength-type white fluorescent lamps 1 each having a spectral characteristic showing steep peaks in the three wavelength regions of R, G and B, respectively, instead of the above white fluorescent lamps having a broad spectral characteristic.

Eight sample devices prepared in the above-described manner were evaluated with respect to the following four items.

(1) Planar uniformity of illumination light

The luminance was measured at a large number of points on the light emission surface of the device so as to evaluate the uniformity of luminance of illumination light. More specifically, the difference between the maximum luminance and the average luminance was obtained, and the reciprocal of the difference was used for evaluation.

(2) Viewing angle characteristic

The luminance change of illumination light was evaluated at various viewing positions. More specifically, a luminance-viewing angle characteristic curve a shown in FIGS. 11 and 15 was obtained to measure a half-width value (degree). The reciprocal of the half-width value was used for evaluation.

(3) Color reproducibility

A chiral smectic liquid crystal display panel and a twisted nematic liquid crystal active matrix-type display panel were respectively illuminated with a sample device to evaluate whether the color reproducibility was uniform within the display panel.

More specifically, a triangle having three corners representing R, G and B was depicted on a CIE color coordinate system and the area of the triangle was measured. The area representing a measure of color reproducing ability was used for evaluation.

Figure 21:
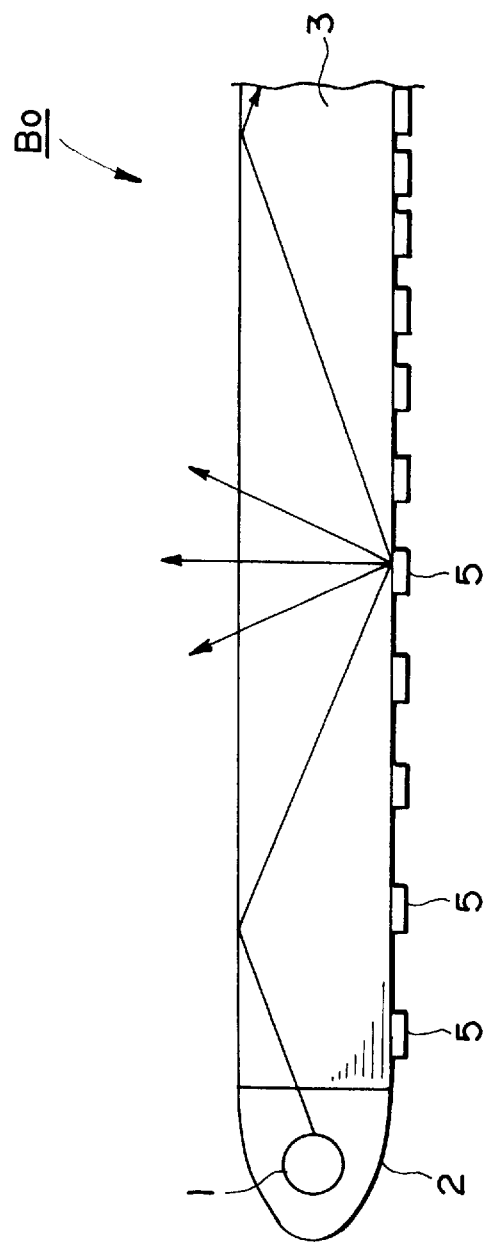
FIG. 21 is a schematic sectional view of a conventional backlight device.

Regarding the above items (1)–(3), the same evaluation was made in parallel by using backlight devices having a conventional structure as shown in FIG. 21 to provide a normalized standard of 1.0. For each item, the sample devices were judge as "C" for a normalized value of 1.0–1.1, "B" for 1.2–1.5 and "A" for 1.6 or larger.

(4) Overall evaluation

Ten panelists were selected at random from ordinary display apparatus users and separately asked to select best three samples which they judged to provide excellent display qualities, among the eight sample devices.

The sample devices were judged as "A" if all the ten panelists judged to be excellent, "C" if no one judged to be excellent, and "B" for an intermediate judgment.

The evaluation results are inclusively shown in the following table.

| Sample device | (1) Planar uniformity | (2) View angle charact. | (3) Color reproducibility | (4) Overall evaluation |
| --- | --- | --- | --- | --- |
| a | C | C | B | C |
| b | B | C | B | B |
| c | A | A | B | B |
| d | A | B | B | B |
| e | C | C | A | C |
| f | B | C | A | B |
| g | A | A | A | A |
| h | A | B | A | A |

Finally, a data transmission apparatus 400 including a backlight device B as described above will now be described with reference to FIG. 19.

Figure 19:
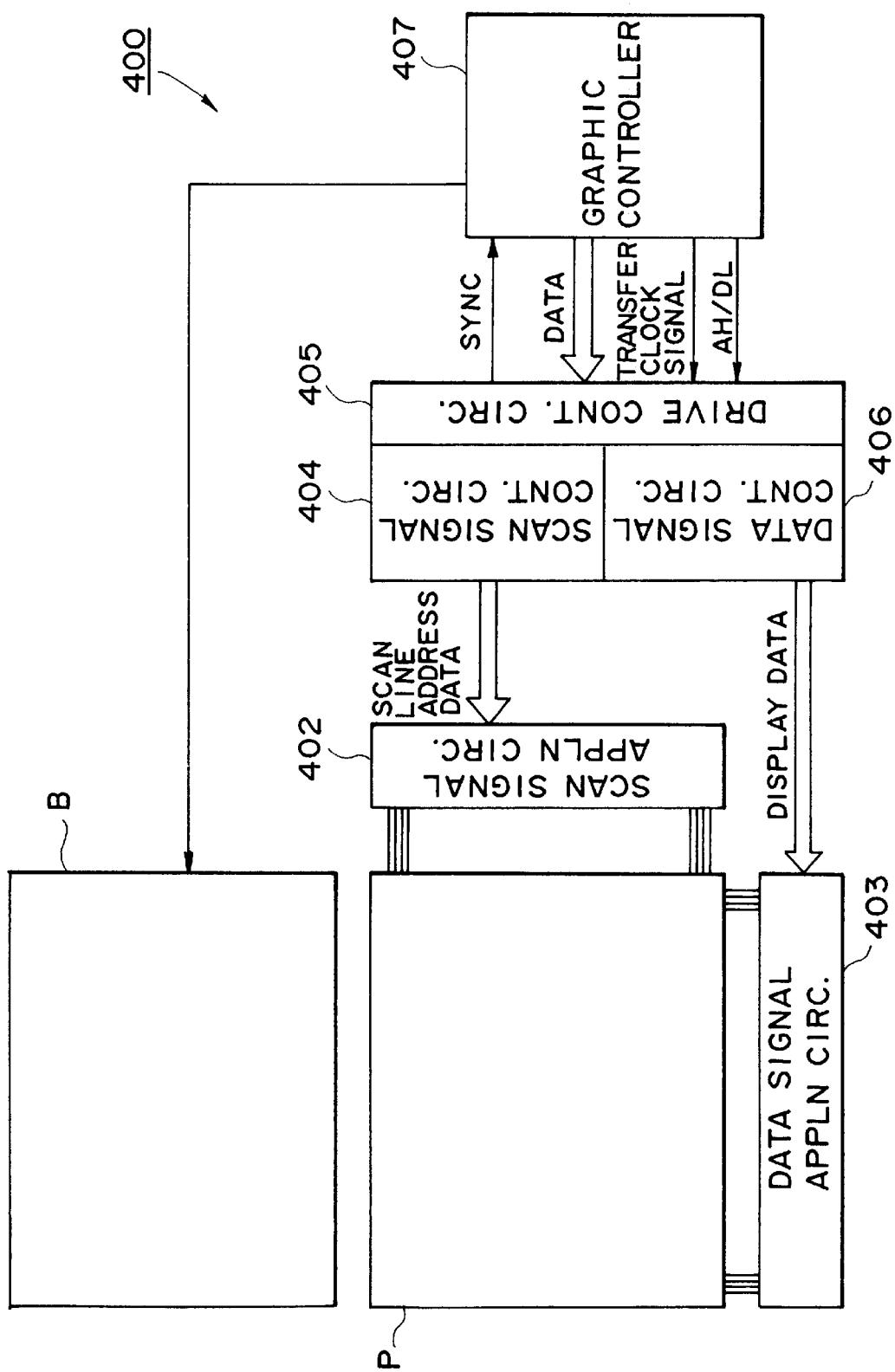

Referring to FIG. 19, the data transmission apparatus 400 includes a liquid crystal panel (display device) P so as to display various data or information by the panel P. As is known, such a liquid crystal panel includes a pair of oppositely disposed substrates, and a liquid crystal disposed between the substrates. The pair of substrates are provided with scanning electrodes and data electrodes so as to form an electrode matrix.

The liquid crystal panel P is connected to a scanning signal application circuit 402 and a data signal transmission circuit 403, which are in turn further connected to a scanning signal control circuit 404 and a data signal control circuit 406, a drive control circuit 405 and a graphic controller 407, sequentially. In operation, data and scanning scheme signals are supplied from the graphic controller 407 via the drive control circuit 405 to the scanning signal control circuit 404 and the data signal control circuit 406, where the data are converted into address data and display data and the other scanning scheme signals are sent as they are to the scanning signal application circuit 402 and the data signal application circuit 403. The scanning signal application circuit 402 applies a scanning signal having a waveform determined by the scanning scheme signals to a scanning electrode determined by the address data, and the data signal application circuit 403 applies data signals having waveforms determined by both display contents of white or black based on the display data and the scanning scheme signals.

Next, a liquid crystal display apparatus 50 provided with a backlight device 10 as described above will now be descried with reference to FIG. 20.

A liquid crystal display apparatus 50 is provided with a backlight device according to any one of the above-descried embodiments. The backlight device 10 is connected to a backlight lighting circuit (backlight drive means) 51 so as to drive the backlight device 10. In front of and opposite to the backlight device 10 is disposed a liquid crystal panel P, which comprises a pair of oppositely disposed glass substrates provided with scanning electrodes and data electrodes, and a ferroelectric liquid crystal disposed between the glass substrates. The scanning electrodes and data electrodes are connected to X-drivers 52 and a Y-driver 53, respectively, which in turn are corrected to a panel drive controller (liquid crystal device drive means) 55. The panel drive controller 55 and the backlight lighting circuit 51 are connected to a power supply unit 56 so as to supply powers. Further, panel drive controller is connected to a host computer (not shown) to be supplied with display signals. On the other hand, based on the display signals, the panel drive controller 55 supplies signals to the liquid crystal panel P via the drivers 52 and 53. Further, the panel drive controller 55 supplies ON/OFF signals and lighting control signals to the backlight lighting circuit 51, which drives the backlight device 10 based on such signals.

What is claimed is:

1. A backlight device, comprising: reflection means for reflecting light, a transmission member disposed opposite to the reflection means so as to form a space from the reflection means, and a light source disposed to emit light into the space, so that light emitted from the light source into the space is reflected by the reflection means and transmitted through the transmission member, wherein said transmission member is provided with a reflection layer having a multitude of apertures, and the apertures are arranged to have an area per unit region of the transmission member, which area increases with an increase in distance from the light source.

2. A backlight device according to claim 1, wherein the light emitted from the light source into the space is repetitively reflected by the reflection means and the reflection layer to be leaked outwards through the transmission member out of the apertures.

3. A backlight device according to claim 2, wherein said reflection means is provided with a scattering layer for scattering and reflecting light on a face of the reflection means opposite to the reflection layer.

4. A backlight device according to claim 3, wherein said scattering layer is provided with a multitude of apertures arranged to have an area per unit region of the scattering layer, which area decreases with an increase in distance from the light source.

5. A backlight device according to claim 1, further including a polarization beam splitter supported on the transmission member for selectively transmitting a p-polarization component and reflecting an s-polarization component, and a quarter wave plate disposed on the reflection means and opposite to the transmission member for causing conversion between the p-polarization component and the s-polarization component, whereby light emitted from the light source into the space is reflected between the polarization beam splitter layer and the reflection means so that the p-polarization component of the emitted light is selectively leaked outwards through the transmission member.

6. A display apparatus having a backlight device according to claim 1, comprising:

a backlight drive means for driving the backlight device, a display device illuminated by the backlight device, and a drive means for driving the display device.

7. A display apparatus according to claim 1, wherein the display device is a liquid crystal display device.

8. A backlight device, comprising: reflection means for reflecting light, a transmission member disposed opposite to the reflection means so as to form a space from the reflection means, and a light source disposed to emit light into the space, so that light emitted from the light source into the space is reflected by the reflection means and transmitted through the transmission member, wherein said transmission member is provided with a reflection layer having a multitude of apertures, so that the light emitted from the light source into the space is repetitively reflected by the reflection means and the reflection layer to be leaked outwards through the transmission member out of the apertures and wherein the apertures are arranged to have an area per unit region of the transmission member, which area increases with an increase in distance from the light source.

9. A backlight device according to claim 8, wherein said reflection means is provided with a scattering layer for scattering and reflecting light on a face of the reflection means opposite to the reflection layer.

10. A backlight device, comprising: reflection means for reflecting light, a transmission member disposed opposite to the reflection means so as to form a space from the reflection means, and a light source disposed to emit light into the space, so that light emitted from the light source into the space is reflected by the reflection means and transmitted through the transmission member, wherein said light transmission member is provided with a reflection layer having a multitude of apertures having an aperture ratio which increases with an increase in distance from the light source toward a center of the space as a linear function, a hyperbolic function or a function which, when plotted, falls within an area circumscribed by plots of the linear and hyperbolic functions, of the distance from the light source.

11. A backlight device, comprising:

a first reflection means for reflecting light, a second reflection means disposed opposite to the first reflection means so as to form a space therebetween and provided with apertures having a prescribed aperture ratio distribution, at least one linear light source disposed to emit light into the space, and at least one sheet of prism means having a multitude of prism ridges extending parallel with the linear light source, so that light emitted from the linear light source is repetitively reflected between the first and second reflection means, and a portion of the light is transmitted through the second reflection means and the prism means to be emitted in a direction deflected toward a normal to the prism means, wherein said prescribed aperture ratio distribution of said second reflection means is such that the aperture ratio increases with an increase in distance from the light source.

12. A backlight device according to claim 11, wherein said prism means is provided in plural sheets.

13. A backlight device according to claim 11, wherein a single sheet of the prism means is provided.

14. A backlight device according to claim 11, wherein said prism means is disposed so that the prism ridges have apex angles directed away from the first reflection means.

15. A backlight device according to claim 11, wherein said prism means is disposed so that the prism ridges have apex angles directed toward the first reflection means.

16. A backlight device according to claim 11, wherein the prism ridges of the prism means have an apex angle of at most 90 degrees.

17. A backlight device according to claim 11, wherein said second reflection means is disposed in a film formed in a pattern of a mesh or discrete dots supported on a front transmission plate disposed space apart from and in parallel with said first means.

18. A backlight device comprising:

first reflection means for reflecting light, a second reflection means disposed opposite to the first reflection means so as to form a space therebetween and provided with apertures having a prescribed aperture ratio distribution, at least one linear light source disposed to emit light into the space, and at least one sheet of prism means having a multitude of prism ridges extending parallel with the linear light source, so that light emitted from the linear light source is repetitively reflected between the first and second reflection means, and a portion of the light is transmitted through the second reflection means and the prism means to be emitted in a direction deflected toward a normal to the prism means, wherein said prism means is provided in plural sheets and wherein a diffusion means is interposed between the plural sheets of the prism means.

19. A backlight device, comprising:

a first reflection means for reflecting light, a second reflection means disposed opposite to the first reflection means so as to form a space therebetween and provided with apertures having a prescribed aperture ratio distribution, at least one linear light source disposed to emit light into the space, and at least one sheet of prism means having a multitude of prism ridges extending parallel with the linear light source, so that light emitted from the linear light source is repetitively reflected between the first and second reflection means, and a portion of the light is transmitted through the second reflection means and the prism means to be emitted in a direction deflected toward a normal to the prism means, wherein the prism ridges of the prism means have an apex angle of 50–70 degrees.

20. A backlight device, comprising:

a first reflection means for reflecting light, a second reflection means disposed opposite to the first reflection means so as to form a space therebetween and provided with apertures having a prescribed aperture ratio distribution, at least one linear light source disposed to emit light into the space, and at least one sheet of prism means having a multitude of prism ridges extending parallel with the linear light source, so that light emitted from the linear light source is repetitively reflected between the first and second reflection means, and a portion of the light is transmitted through the second reflection means and the prism means to be emitted in a direction deflected toward a normal to the prism means, wherein said second reflection means has an aperture ratio distribution which increases with an increase in distance from the linear light source as a linear function, a hyperbolic function or function which, when plotted, falls with an area circumscribed by plots of the linear and hyperbolic functions, of the distance from the linear light source.

21. A backlight device, comprising: reflection means for reflecting light, said reflection means having lateral sides and a reflecting surface between the lateral sides, a transmission member disposed opposite to the reflecting surface of said reflection means so as to form a space from said reflection means, and a pair of light sources respectively disposed at the lateral sides of said reflection means to emit light into the space, so that light emitted from the light sources into the space is reflected by said reflection means and transmitted through said transmission member, wherein said transmission member is provided with a reflection layer having a multitude of apertures, and the apertures are arranged to have an area per unit region of said transmission member, which area increases with an increase in distance from the light sources so as to provide a maximum area per unit region at a mid point between the pair of light sources.

22. A backlight device according to claim 21, wherein said reflection means comprises a plate which is convex in shape toward said transmission member at a central region thereof.

23. A display apparatus having a backlight device according to claim 21, comprising: a backlight drive means for driving the backlight device, a display device illuminated by the backlight device, and drive means for driving the display device.

* * * * *

UNITED STATES PATENT AND TRADEMARK OFFICE
CERTIFICATE OF CORRECTION

PATENT NO. : 5,816,677

DATED : October 6, 1998

INVENTOR(S): KATSUMI KUREMATSU ET AL.

It is certified that error appears in the above-identified patent and that said Letters Patent is hereby corrected as shown below:

<u>ON COVER PAGE AT [30] FOREIGN APPLICATION PRIORITY DATA</u>

"Mar. 1, 1905" should read --Mar. 1, 1995--.

<u>ON COVER PAGE AT [56] REFERENCES CITED, FOREIGN PATENT DOCUMENTS</u>

"5281541" should read --5-281541--;
"5323318" should read --5-323318--.

<u>ON COVER PAGE AT [56] REFERENCES CITED, OTHER PUBLICATIONS</u>

"Inc)" should read --Inc.)--;
"Corp)" should read --Corp.)--.

<u>COLUMN 1</u>

Line 46, "parabora" should read --parabolic--.

<u>COLUMN 2</u>

Line 31, "capable" should read --capable of--.

<u>COLUMN 3</u>

Line 42, "of" should read --of the--.

UNITED STATES PATENT AND TRADEMARK OFFICE
CERTIFICATE OF CORRECTION

PATENT NO. : 5,816,677

DATED : October 6, 1998

INVENTOR(S): KATSUMI KUREMATSU ET AL.

It is certified that error appears in the above-identified patent and that said Letters Patent is hereby corrected as shown below:

COLUMN 4

Line 23, "of" should read --of the--;
Line 27, "light light" should read --light--;
Line 45, "pattern of" should read --the pattern of the--;
Line 56, "portions" should read --portions of--; and "circles" should read --circles,--;
Line 59, "descried" should read --described--.

COLUMN 7

Line 11, "is" should read --are--;
Line 34, "plat" should read --plate--;
Line 49, "plat" should read --plate--.

COLUMN 8

Line 54, "an" should be deleted.

COLUMN 14

Line 18, "light-guides" should read --light-guide--.

UNITED STATES PATENT AND TRADEMARK OFFICE
CERTIFICATE OF CORRECTION

PATENT NO. : 5,816,677

DATED : October 6, 1998

INVENTOR(S): KATSUMI KUREMATSU ET AL.

It is certified that error appears in the above-identified patent and that said Letters Patent is hereby corrected as shown below:

COLUMN 15

Line 28, "light-guides" should read --light-guide--;
Line 43, "have" should read --has--.

COLUMN 16

Line 31, "Y direction" should read --Y-direction--.

COLUMN 17

Line 35, "best" should read --the best--;
Line 37, "qualities," should read --qualities from--.

COLUMN 18

Line 23, "descried" should read --described--;
Line 24, "descried" should read --described--;
Line 38, "powers" should read --power--.

UNITED STATES PATENT AND TRADEMARK OFFICE
CERTIFICATE OF CORRECTION

PATENT NO. : 5,816,677

DATED : October 6, 1998

INVENTOR(S): KATSUMI KUREMATSU ET AL.

It is certified that error appears in the above-identified patent and that said Letters Patent is hereby corrected as shown below:

COLUMN 20

Line 32, "space" should read --spaced--.

COLUMN 21

Line 27, "with" should read --within--.

Signed and Sealed this

Twenty-fourth Day of August, 1999

Attest:

Q. TODD DICKINSON

Attesting Officer

Acting Commissioner of Patents and Trademarks